United States Patent
Zhang et al.

(10) Patent No.: US 12,323,903 B2
(45) Date of Patent: Jun. 3, 2025

(54) CONFIGURATION INFORMATION DETERMINATION METHOD AND APPARATUS, INFORMATION CONFIGURATION METHOD AND APPARATUS, AND TERMINAL, BASE STATION, AND STORAGE MEDIUM

(71) Applicant: ZTE CORPORATION, Shenzhen (CN)

(72) Inventors: Xiaotong Zhang, Shenzhen (CN); Bo Dai, Shenzhen (CN); Kun Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 273 days.

(21) Appl. No.: 17/798,254

(22) PCT Filed: Jan. 19, 2021

(86) PCT No.: PCT/CN2021/072689
§ 371 (c)(1),
(2) Date: Aug. 8, 2022

(87) PCT Pub. No.: WO2021/179799
PCT Pub. Date: Sep. 16, 2021

(65) Prior Publication Data
US 2023/0070993 A1    Mar. 9, 2023

(30) Foreign Application Priority Data
Mar. 11, 2020 (CN) .......................... 202010167540.4

(51) Int. Cl.
*H04W 48/12* (2009.01)
*H04L 5/00* (2006.01)

(52) U.S. Cl.
CPC ............ *H04W 48/12* (2013.01); *H04L 5/0051* (2013.01)

(58) Field of Classification Search
CPC . H04W 48/12; H04W 72/23; H04W 72/0446; H04W 72/0453; H04L 5/0051;
(Continued)

(56) References Cited

U.S. PATENT DOCUMENTS

| 2019/0158205 A1 | 5/2019 | Sheng et al. |
| 2020/0045658 A1 | 2/2020 | Nam et al. |

FOREIGN PATENT DOCUMENTS

| CN | 110505642 A | 11/2019 |
| CN | 110574328 A | 12/2019 |

(Continued)

OTHER PUBLICATIONS

Indian Office Action for Application No. 202227057938 dated Mar. 31, 2023, 8 pages.

(Continued)

*Primary Examiner* — Cheikh T Ndiaye
(74) *Attorney, Agent, or Firm* — Morgan, Lewis & Bockius LLP

(57) ABSTRACT

Provided are a configuration information determination method and apparatus, an information configuration method and apparatus, a terminal, a base station, and a storage medium. The configuration information determination method includes determining, by a first type terminal, according to physical downlink control channel (PDCCH) configuration signaling corresponding to system information block 1 (SIB1) in a master information block (MIB) sent by a base station, configuration information of a first control resource set zero (CORESET0) corresponding to the first type terminal, where the PDCCH configuration signaling corresponding to the SIB1 in the MIB corresponds to a (Continued)

second CORESET0 corresponding to a second type terminal.

16 Claims, 8 Drawing Sheets

(58) Field of Classification Search
CPC ... H04L 5/0053; H04L 5/0064; H04L 5/0094; Y02D 30/70
See application file for complete search history.

(56) References Cited

FOREIGN PATENT DOCUMENTS

| | | | |
|---|---|---|---|
| CN | 110602731 | A | 12/2019 |
| CN | 111901085 | A | 11/2020 |
| EP | 3912297 | A1 | 11/2021 |
| EP | 4017070 | A1 * | 6/2022 ........... H04L 5/0051 |
| EP | 4033798 | A1 | 7/2022 |
| EP | 4109955 | A1 | 12/2022 |
| WO | WO-2019187989 | A1 | 10/2019 |

OTHER PUBLICATIONS

International Search Report for Application No. PCT/CN2021/072689, dated Mar. 31, 2021, 4 pages including English translation.
Extended European Search Report for Application No. 21768432.3 dated Mar. 13, 2024, 16 pages.
Samsung, "Remaining Issues on PDCCH and Search Space Design", 3GPP TSG RAN WG1 Meeting #94bis, R1-1811640, Chengdu, China, Oct. 8, 2018, 8 pages.
First Search Report in Chinese Application No. 2020101675404, dated Aug. 21, 2024, 5 pages, including translation.
First Office Action in Chinese Application No. 202010167540.4, dated Aug. 26, 2024, 17 pages, including translation.

* cited by examiner

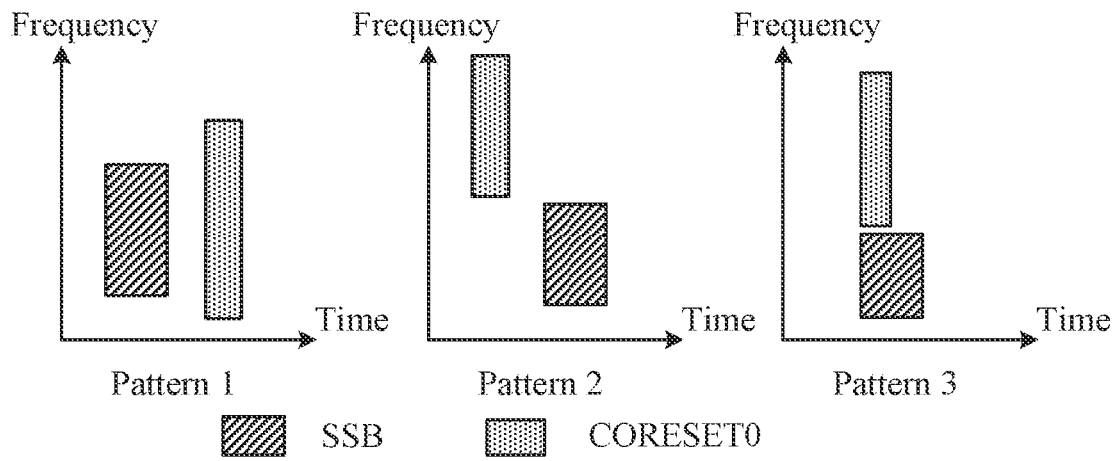
FIG. 1
A first type terminal determines, according to PDCCH configuration signaling corresponding to SIB1 in an MIB sent by a base station, configuration information of first CORESET0 corresponding to the first type terminal — S201
FIG. 2
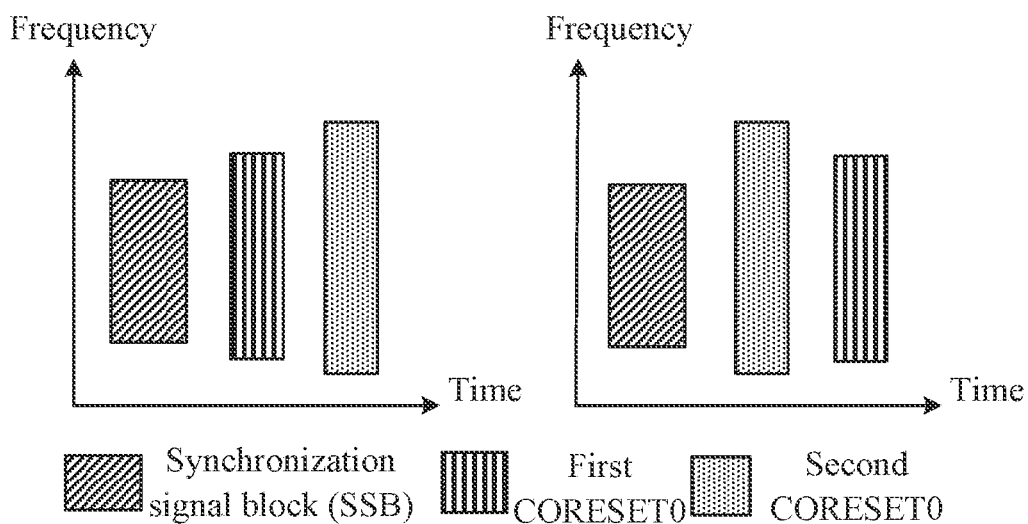
FIG. 3

| Slot 0 | Slot 1 | Slot 2 | Slot 3 | Slot 4 | Slot 5 | Slot 6 |
|---|---|---|---|---|---|---|
| SSB0 SSB1 | SSB2 SSB3 | First CORESET / Second CORESET | First CORESET / Second CORESET | First CORESET / Second CORESET | First CORESET / Second CORESET | First CORESET / Second CORESET |

FIG. 13

| Slot 0 | Slot 1 | Slot 2 | Slot 3 | Slot 4 | Slot 5 | Slot 6 |
|---|---|---|---|---|---|---|
| SSB0 SSB1 | SSB2 SSB3 | Second CORESET / First CORESET | Second CORESET / First CORESET | Second CORESET / First CORESET | Second CORESET / First CORESET | Second CORESET / First CORESET |

FIG. 14

A base station sends PDCCH configuration signaling corresponding to SIB1 in an MIB — S1501

FIG. 15

CONFIGURATION INFORMATION DETERMINATION METHOD AND APPARATUS, INFORMATION CONFIGURATION METHOD AND APPARATUS, AND TERMINAL, BASE STATION, AND STORAGE MEDIUM

CROSS REFERENCE TO RELATED APPLICATIONS

This application is a national stage application filed under 35 U.S.C. 371 based on International Patent Application No. PCT/CN2021/072689, filed on Jan. 19, 2021, which claims priority to Chinese Patent Application No. 202010167540.4 filed with the China National Intellectual Property Administration (CNIPA) on Mar. 11, 2020, the disclosures of which are incorporated herein by reference in their entireties.

TECHNICAL FIELD

The present application relates to the field of communication technologies, for example, a configuration information determination method and apparatus, an information configuration method and apparatus, a terminal, a base station, and a storage medium.

BACKGROUND

In a New Radio (NR) system, a conventional terminal (such as a mobile phone) receives a Synchronization Signal and Physical Broadcast CHannel Block (SSB) in advance in an initial access process, where the SSB is used for carrying time-frequency domain resources of access-related signals and channels, such as a synchronization signal, a Physical Broadcast Channel (PBCH) and a Demodulation Reference Signal (DMRS) corresponding to the PBCH. The Master Information Block (MIB) carried in the PBCH includes reception configuration information of Control Resource Set zero (CORESET0). The CORESET0 is used for carrying Type0 Physical Downlink Control Channel (PDCCH) and may also carry reception configuration information of System Information Block 1 (SIB1). After receiving the SSB, the conventional terminal may acquire configuration information of corresponding CORESET0 according to indication information in the MIB, for example, a time domain position of the CORESET0 and a size of the occupied resource.

However, compared with the conventional terminal, after low-capacity terminal devices with smaller bandwidth capabilities and fewer antennas such as smart wearable devices and industrial sensors receive the SSB, since the bandwidth configuration of the CORESET0 exceeds a bandwidth range of such low-capacity terminal devices, or a multiplexing manner of the CORESET0 and the SSB is not supported by such low-capacity terminal devices, such low-capacity terminal devices cannot further receive the CORESET0 and thus cannot access a network, or such low-capacity terminal devices can access the network, but cannot coexist with conventional terminal devices in the network.

SUMMARY

An embodiment of the present application provides a configuration information determination method. The method includes the following.

A first type terminal determines, according to physical downlink control channel (PDCCH) configuration signaling corresponding to system information block 1 (SIB1) in a master information block (MIB) sent by a base station, configuration information of a first control resource set zero (CORESET0) corresponding to the first type terminal, where CORESET0 corresponding to the PDCCH configuration signaling corresponding to the SIB1 in the MIB corresponds to a second CORESET0 corresponding to a second type terminal.

An embodiment of the present application provides an information configuration method. The method includes the following.

A base station sends physical downlink control channel (PDCCH) configuration signaling corresponding to system information block 1 (SIB1) in a master information block (MIB), where the PDCCH configuration signaling is used for indicating configuration information of a first control resource set zero (CORESET0) corresponding to a first type terminal, and the PDCCH configuration signaling corresponding to the SIB1 in the MIB corresponds to a second CORESET0 corresponding to a second type terminal.

An embodiment of the present application provides a configuration information determination apparatus. The apparatus includes a determination module.

The determination module is configured to determine, according to physical downlink control channel (PDCCH) configuration signaling corresponding to system information block 1 (SIB1) in a master information block (MIB) sent by a base station, configuration information of a first control resource set zero (CORESET0) corresponding to a first type terminal, where the PDCCH configuration signaling corresponding to the SIB1 in the MIB corresponds to a second CORESET0 corresponding to a second type terminal.

An embodiment of the present application provides an information configuration apparatus. The apparatus includes a sending module.

The sending module is configured to send physical downlink control channel (PDCCH) configuration signaling corresponding to system information block 1 (SIB1) in a master information block (MIB), where the PDCCH configuration signaling is used for indicating configuration information of a first control resource set zero (CORESET0) corresponding to a first type terminal, and the PDCCH configuration signaling corresponding to the SIB1 in the MIB corresponds to a second CORESET0 corresponding to a second type terminal.

An embodiment of the present application provides a terminal including a memory, a processor, and a computer program stored in the memory and executable by the processor, where the processor, when executing the computer program, performs the configuration information determination method in embodiments of the present application.

An embodiment of the present application provides a base station including a memory, a processor, and a computer program stored in the memory and executable by the processor, where the processor, when executing the computer program, performs the information configuration method in the embodiments of the present application.

An embodiment of the present application provides a computer-readable storage medium, which is configured to store computer programs for performing the configuration information determination method in the embodiments of the present application when the computer programs are executed by a processor.

An embodiment of the present application provides a computer-readable storage medium, which is configured to store computer programs for performing the information configuration method in the embodiments of the present application when the computer programs are executed by a processor.

BRIEF DESCRIPTION OF DRAWINGS

FIG. 1 is a schematic diagram of multiplexing patterns between a CORESET0 and an SSB;

FIG. 2 is a flowchart of a configuration information determination method according to an embodiment;

FIG. 3 is a schematic diagram of a relative positional relationship between an SSB and each of a first CORESET0 and a second CORESET0 according to an embodiment;

FIG. 10 is a schematic diagram of slots occupied by search spaces of a first type terminal and a second type terminal according to an embodiment;

FIG. 11 is a schematic diagram of slots occupied by search spaces of a first type terminal and a second type terminal according to an embodiment;

FIG. 12 is a schematic diagram of slots occupied by search spaces of a first type terminal and a second type terminal according to an embodiment;

FIG. 13 is a schematic diagram of slots occupied by search spaces of a first type terminal and a second type terminal according to an embodiment;

FIG. 14 is a schematic diagram of slots occupied by search spaces of a first type terminal and a second type terminal according to an embodiment;

FIG. 15 is a flowchart of an information configuration method according to an embodiment;

DETAILED DESCRIPTION

Figure 4:
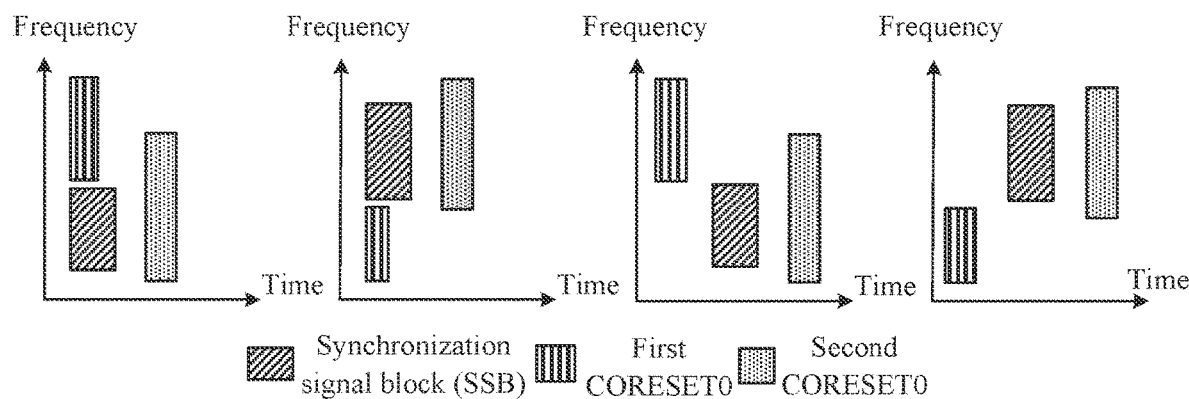
FIG. 4 is a schematic diagram of a relative positional relationship between an SSB and each of a first CORESET0 and a second CORESET0 according to an embodiment.

Embodiments of the present application are described hereinafter in detail in conjunction with drawings. If not in collision, the embodiments of the present application and features in the embodiments may be combined with each other.

In addition, in the embodiments of the present application, words such as "optionally" or "exemplarily" are used for representing examples, illustrations, or descriptions. The "first" and "second" involved in the embodiments of the present application are only used for distinguishing between different concepts, messages and the like, and are not used for limiting a sequence.

In embodiments of the present application, terminals, for example, a smart wearable device, an industrial sensor and the like, with a bandwidth capability less than that of conventional terminals, for example, terminals with a maximum bandwidth supporting 10 MHz, 20 MHz, or 40 MHz in frequency range 1 (FR1) and 50 MHz or 100 MHz in frequency range 2 (FR2) and unable to support all configurations of CORESET0 are collectively referred to as a first type terminal, and the conventional terminals, such as terminals defined in Release 15 and Release 16, such as a mobile phone, are collectively referred to as a second type terminal.

In an NR network, the second type terminal acquires, according to PDCCH configuration signaling corresponding to SIB1 in an MIB, corresponding CORESET0 configuration information and configuration information of search space 0. A set of tables are defined in the related art, and some contents are described in Table 1 and used for indicating CORESET0 configuration information. A specific indication manner is: 4-bit information is used for indicating indexes 0 to 15, and each index indicates 4 pieces of contents, which are multiplexing patterns between an SSB and CORESET0, the number of resource blocks (RBs) of the CORESET0 $N_{RB}^{CORESET}$, the number of symbols of the CORESET0 $N_{symb}^{CORESET}$, and a frequency domain offset between the CORESET0 and the SSB. As shown in FIG. 1, a multiplexing pattern of 1 represents that the CORESET0 and the SSB occupy different symbols in a time domain and the CORESET0 includes the SSB in a frequency domain, a multiplexing pattern of 2 represents that the CORESET0 and the SSB occupy different resources in the frequency domain and the SSB occupies symbols before the CORESET0 in the time domain, and a multiplexing pattern of 3 represents that the CORESET0 and the SSB occupy different resources in the frequency domain and occupy the same symbols in the time domain. The configuration information of the search space 0 is also used for indicating the indexes 0 to 15, and configuration information corresponding to the indexes may be used for determining a time domain position of the search space 0, which is also a time domain position of the CORESET0.

Exemplarily, the content of Table 1 is used for indicating the case where the {Synchronization Signal/Physical Broadcast CHannel Block, PDCCH} subcarrier interval combination is {15 kHz, 15 kHz} and a minimum channel bandwidth is 5 MHz or 10 MHz.

TABLE 1

| Index | Multiplexing pattern | $N_{RB}^{CORESET}$ | $N_{symb}^{CORESET}$ | offset |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |

TABLE 1-continued

| Index | Multiplexing pattern | $N_{RB}^{CORESET}$ | $N_{symb}^{CORESET}$ | offset |
|---|---|---|---|---|
| 12 | 1 | 96 | 1 | 38 |
| 13 | 1 | 96 | 2 | 38 |
| 14 | 1 | 96 | 3 | 38 |
| 15 | | Reserved | | |

However, the bandwidth capability of the first type terminal cannot fully support the CORESET0 configuration described in Table 1. For example, assuming that the bandwidth capability of the first type terminal is 10 MHz, in the case where the CORESET0 is configured with 96 RBs and an occupied bandwidth is 17.28 MHz, then the first type terminal cannot support the CORESET0 at this time. In an NR system, to be compatible with access of the first type terminal, a network side needs to configure a lower bandwidth for the CORESET0, such as 24 or 48 RBs, when configuring initial access related signal channels, so that the configuration of the CORESET0 with indexes 12 to 14 is restricted, thereby affecting the performance of the second type terminal accessing the network.

Based on defects existing in the preceding scenario, FIG. 2 provides a flowchart of a configuration information determination method. The method may be applied to the first type terminal. As shown in FIG. 2, the method includes the following.

In S201, a first type terminal determines, according to PDCCH configuration signaling corresponding to SIB1 in an MIB sent by a base station, configuration information of first CORESET0 corresponding to the first type terminal.

CORESET0 corresponding to the PDCCH configuration signaling corresponding to the SIB1 in the MIB is a second CORESET0 corresponding to a second type terminal.

Optionally, the second type terminal is different from the first type terminal in at least one of a bandwidth, a cost, complexity, a processing capability, power consumption, or a device size.

If the first type terminal and the second type terminal receive the same SSB, the first type terminal and the second type terminal receive the same 4-bit CORESET0 indication information, where the 4-bit information indicates an index value. The first type terminal and the second type terminal may respectively acquire corresponding CORESET0 configuration information according to the same acquired index value.

Exemplarily, in the case where the second CORESET0 corresponding to the second type terminal is applicable to the first type terminal, it represents that the second CORESET0 is the same as the first CORESET0; otherwise, if the second CORESET0 is not applicable to the first type terminal, the first type terminal acquires configuration information of the first CORESET0 according to the PDCCH configuration signaling corresponding to the SIB1 in the MIB.

In the preceding manner, regardless of whether the CORESET0 configuration corresponding to the index sent by the base station exceeds an access capability of the first type terminal, the first type terminal can obtain the configuration information of the first CORESET0. Therefore, in the case where the first type terminal and the second type terminal coexist in the network, the first type terminal can still access the network correctly according to the configuration information so that it is ensured that the first type terminal can smoothly access the network according to the configuration information without affecting the performance of the second type terminal to access the network.

In the embodiments of the present application, the configuration information of the first CORESET0 is similar to the configuration information of the second CORESET0 and includes a positional relationship between the SSB and the CORESET0, the number of RBs of the CORESET0 $N_{RB}^{CORESET}$, the number of symbols of the CORESET0 $N_{symb}^{CORESET}$, and the frequency domain offset between the CORESET0 and the SSB.

In an example, in the case where a frequency range of a carrier frequency is the FR1, that is, 410 MHz to 7125 MHz, configuration information corresponding to multiple index values of the first CORESET0 may be described in Table 2.

TABLE 2

| Index | Multiplexing pattern | $N_{RB}^{CORESET}$ | $N_{symb}^{CORESET}$ | offset |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1, 2, 3 | 24, 48 | 1, 2, 3 | 12, 14, 16 |
| 13 | 1, 2, 3 | 24, 48 | 1, 2, 3 | 12, 14, 16 |
| 14 | 1, 2, 3 | 24, 48 | 1, 2, 3 | 12, 14, 16 |
| 15 | | Reserved | | |

It can be seen from Table 1 and Table 2 that in the case where the indexes sent by the base station are indexes 0 to 11, the first type terminal and the second type terminal acquires the same configuration information, that is, acquire the same CORESET0. In the case where the first type terminal cannot acquire CORESET0 configuration information corresponding to the second type terminal with indexes 12 to 14 due to a bandwidth limitation (for example, 10 MHz), through the solution provided in the embodiments of the present application, the first type terminal can, based on the configuration information of the first CORESET0 (that is, Table 2), correctly acquire the CORESET0 configuration information corresponding to the indexes so that the first type terminal and the second type terminal coexist in the network.

In an embodiment, the content of Table 2 is merely an exemplary presentation of the configuration information of the first CORESET0 in the case where the {SSB, PDCCH} subcarrier interval combination is {15 kHz, 15 kHz}, and does not limit the specific configuration information of the first CORESET0.

Exemplarily, it is assumed that the configuration information of indexes 12 to 14 in Table 2 is described in Table 3.

TABLE 3

| Index | Multiplexing pattern | $N_{RB}^{L\_CORESET}$ | $N_{symb}^{L\_CORESET}$ | offset |
|---|---|---|---|---|
| 12 | 1 | 48 | 2 | 14 |
| 13 | 1 | 48 | 3 | 12 |
| 14 | 1 | 48 | 3 | 16 |

That is, in the case where the number of RBs of the first CORESET0 is 48 RBs among all configuration scenarios (24, 48, and 96) of the number of RBs of the first CORESET0, not only an access condition of the first type terminal can be satisfied, but also a larger CORESET0 bandwidth can be provided relative to 24 RBs, and the configuration of 3 symbols can provide more time domain resources than the configuration of 1 or 2 symbols. In addition, the two different configurations of 2 and 3 symbols can provide certain flexibility in time domain configuration, and the frequency domain offset provides three different configurations of 12, 14, and 16 so that certain configuration flexibility can be provided, and the frequency domain position configuration of the first CORESET0 satisfies a principle that frequency center positions of the first CORESET0 and the SSB are aligned as much as possible. FIG. 3 provides two possible relative positional relationships between the SSB and the first CORESET0 and between the SSB and the second CORESET0 in an example of Table 3.

Optionally, the configuration information of indexes 12 to 14 in Table 2 may also be described in Table 4 and Table 5.

TABLE 4

| Index | Multiplexing pattern | $N_{RB}^{L\_CORESET}$ | $N_{symb}^{L\_CORESET}$ | offset |
|---|---|---|---|---|
| 12 | 2 | 24 | 2 | −20 if $k_{SSB} = 0$<br>−21 if $k_{SSB} > 0$ |
| 13 | 2 | 24 | 2 | 24 |
| 14 | 3 | 24 | 2 | 24 |

TABLE 5

| Index | Multiplexing pattern | $N_{RB}^{L\_CORESET}$ | $N_{symb}^{L\_CORESET}$ | offset |
|---|---|---|---|---|
| 12 | 2 | 24 | 2 | 24 |
| 13 | 3 | 24 | 2 | −20 if $k_{SSB} = 0$<br>−21 if $k_{SSB} > 0$ |
| 14 | 3 | 24 | 2 | 24 |

A parameter $k_{SSB}$ in Table 4 and Table 5 denotes a carrier offset between subcarrier 0 of the SSB and subcarrier 0 of a common resource block (CRB) $N_{CRB}^{SSB}$ in the frequency domain, $N_{CRB}^{SSB}$ denotes a CRB with the lowest frequency domain position among all CRBs that overlap with the SSB in the frequency domain.

In the case where the configuration of the first CORESET0 multiplexing patterns 2 and 3 in Table 4 and Table 5 is provided, the SSB and the first CORESET0 are frequency-division multiplexed so that the first CORESET0 occupies less time domain resources, and a synchronization delay can be effectively reduced. The configuration of the multiplexing patterns 2 and 3 not only provides flexibility of the time domain position of the first CORESET0, and the multiplexing pattern 3 can also reserve more resources for a Physical Downlink Shared Channel (PDSCH); positive and negative configurations of frequency domain offsets between the SSB and the first CORESET0 also provide flexibility of the frequency domain position of the first CORESET0. FIG. 4 shows several possible relative positional relationships between the SSB and the first CORESET0 and between the SSB and the second CORESET0 in examples of Table 4 and Table 5.

In an example, in the case where the frequency range of the carrier frequency is the FR2, that is, 24250 MHz to 52600 MHz, and the {SSB, PDCCH} subcarrier interval combination is {120 kHz, 60 kHz}, the configuration information of the first CORESET0 may be described in Table 6.

TABLE 6

| Index | Multiplexing pattern | $N_{RB}^{CORESET}$ | $N_{symb}^{CORESET}$ | offset |
|---|---|---|---|---|
| 0 | 1 | 48 | 1 | 0 |
| 1 | 1 | 48 | 1 | 8 |
| 2 | 1 | 48 | 2 | 0 |
| 3 | 1 | 48 | 2 | 8 |
| 4 | 1 | 48 | 3 | 0 |
| 5 | 1 | 48 | 3 | 8 |
| 6 | 1 | 96 | 1 | 28 |
| 7 | 1 | 96 | 2 | 28 |
| 8 | 2 | 48 | 1 | −41 if $k_{SSB} = 0$<br>−42 if $k_{SSB} > 0$ |
| 9 | 2 | 48 | 1 | 49 |
| 10 | 1, 2, and 3 (Second CORESET0 is 2) | 48 and 96 (Second CORESET0 is 96) | 1, 2, and 3 (Second CORESET0 is 1) | 28, 49, −41, and −42 (Second CORESET0 is −41 if $k_{SSB} = 0$<br>−42 if $k_{SSB} > 0$) |
| 11 | 1, 2, and 3 (Second CORESET0 is 2) | 48 and 96 (Second CORESET0 is 96) | 1, 2, and 3 (Second CORESET0 is 1) | 28, 49, −41, and −42 (Second CORESET0 is 97) |
| 12 | Reserved | | | |
| 13 | Reserved | | | |
| 14 | Reserved | | | |
| 15 | Reserved | | | |

Different configuration information of the first CORESET0 and the second CORESET0 is compared in Table 6. In the case where the indexes sent by the base station are indexes 0 to 9, the first type terminal and the second type terminal may acquire the same configuration information. In the case where the indexes sent by the base station are indexes 10 and 11, for the existing (or in a second CORESET0 configuration table) configuration information corresponding to the indexes 10 and 11 that cannot be acquired by the first type terminal, the first type terminal may acquire correct CORESET0 configuration information corresponding to the indexes 10 and 11 based on Table 6, so as to ensure the smooth progress of subsequent steps, and the second type terminal may acquire the CORESET0 configuration information corresponding to the indexes 10 and 11 based on the second CORESET0 configuration table stored by the second type terminal itself, that is, configuration information marked in Table 6. In this manner, the first type terminal and the second type terminal can coexist in the network.

In an embodiment, the configuration information of the first CORESET0 in Table 6 is only an exemplary presentation, and does not limit the specific content of the configuration information of the first CORESET0.

Exemplarily, it is assumed that the configuration information of indexes 10 and 11 in Table 6 is described in Table 7.

TABLE 7

| Index | Multiplexing pattern | $N_{RB}^{L\_CORESET}$ | $N_{symb}^{L\_CORESET}$ | offset |
|---|---|---|---|---|
| 10 | 1 | 96 | 1 | 28 |
| 11 | 1 | 96 | 2 | 28 |

In an example of Table 7, in the case where the multiplexing pattern 1 is adopted for the SSB and the first CORESET0, the bandwidth satisfies the first CORESET0 configuration of 96 RBs so that the first CORESET0 with a larger bandwidth can be provided, and the number of symbols, 1 or 2, can be configured flexibly. In addition, the frequency domain offset configuration of 28 RBs can make the frequency domain position configuration of the first CORESET0 satisfy the principle that the frequency center positions of the first CORESET0 and the SSB are aligned as much as possible.

Figure 5:
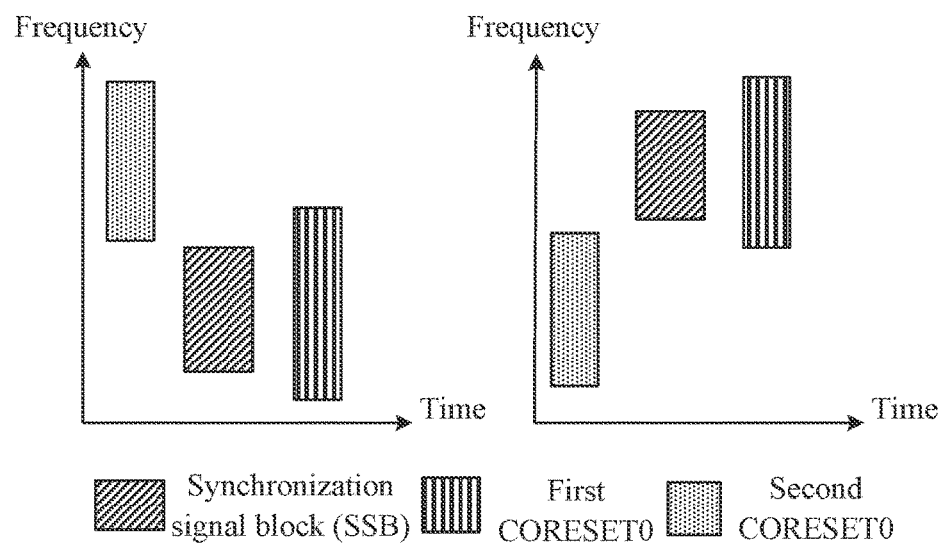
FIG. 5 is a schematic diagram of a relative positional relationship between an SSB and each of a first CORESET0 and a second CORESET0 according to an embodiment.

FIG. 5 provides two possible relative positional relationships between the SSB and the first CORESET0 and between the SSB and the second CORESET0 in an example of Table 7.

Optionally, the configuration information of the indexes 10 and 11 in Table 6 may also be described in Tables 8, 9, and 10.

TABLE 8

| Index | Multiplexing pattern | $N_{RB}^{L\_CORESET}$ | $N_{symb}^{L\_CORESET}$ | offset |
|---|---|---|---|---|
| 10 | 2 | 48 | 1 | 49 |
| 11 | 2 | 48 | 1 | −41 if $k_{SSB} = 0$<br>−42 if $k_{SSB} > 0$ |

TABLE 9

| Index | Multiplexing pattern | $N_{RB}^{L\_CORESET}$ | $N_{symb}^{L\_CORESET}$ | offset |
|---|---|---|---|---|
| 10 | 3 | 48 | 1 | 49 |
| 11 | 3 | 48 | 1 | −41 if $k_{SSB} = 0$<br>−42 if $k_{SSB} > 0$ |

TABLE 10

| Index | Multiplexing pattern | $N_{RB}^{L\_CORESET}$ | $N_{symb}^{L\_CORESET}$ | offset |
|---|---|---|---|---|
| 10 | 3 | 48 | 1 | −41 if $k_{SSB} = 0$<br>−42 if $k_{SSB} > 0$ |
| 11 | 3 | 48 | 1 | 49 |

Figure 6:
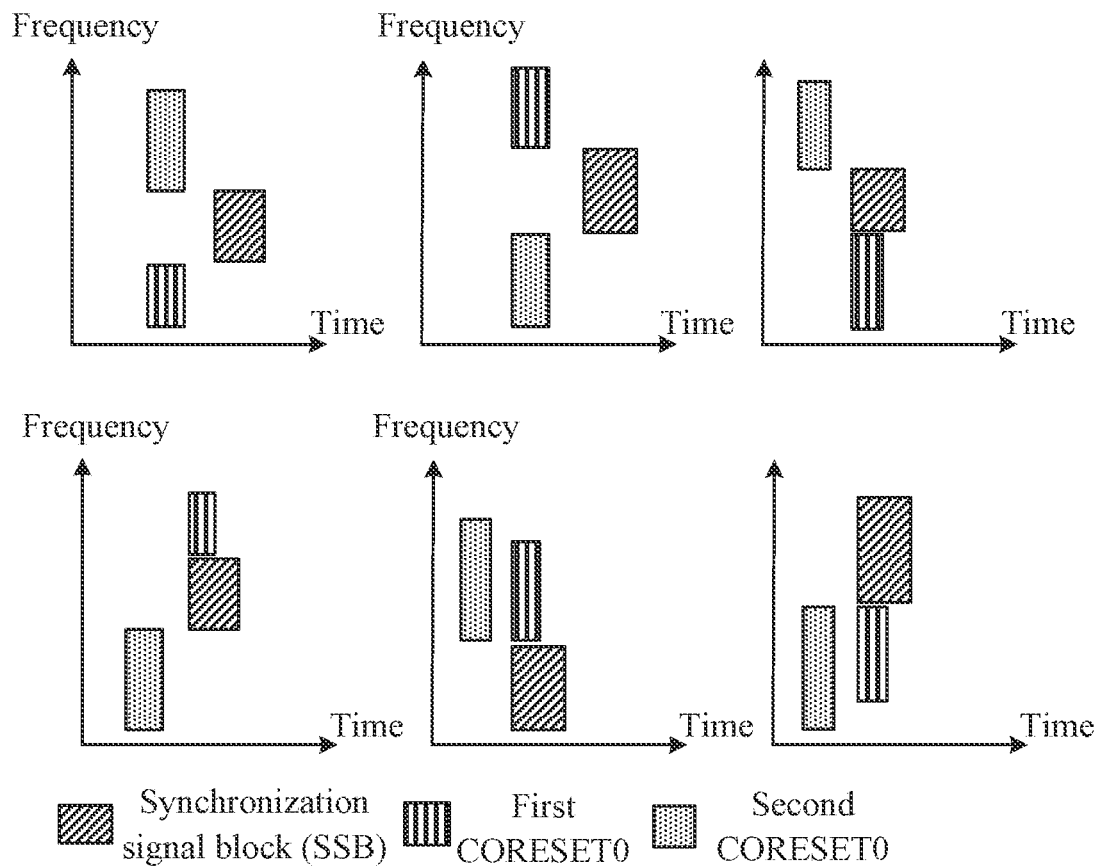
FIG. 6 is a schematic diagram of a relative positional relationship between an SSB and each of a first CORESET0 and a second CORESET0 according to an embodiment.

In the case where the configuration of the multiplexing pattern 2 or 3 of the first CORESET0 and the SSB in Tables 8 to 10 is provided, less time domain resources can be occupied, and such a configuration can make the synchronization delay lower. In addition, the frequency domain offset configuration of the first CORESET0 and the SSB can also ensure that the first CORESET0 and the second CORESET0 do not affect each other. FIG. 6 provides several possible relative positional relationships between the SSB and the first CORESET0 and between the SSB and the second CORESET0 in examples of Tables 8 to 10.

In an example, in the case where the frequency range of the carrier frequency is the FR2 and the {SSB, PDCCH} subcarrier interval combination is {120 kHz, 120 kHz}, the configuration information of the first CORESET0 may be described in Table 11.

TABLE 11

| Index | Multiplexing pattern | $N_{RB}^{CORESET}$ | $N_{symb}^{CORESET}$ | offset |
|---|---|---|---|---|
| 0 | 1 | 24 | 2 | 0 |
| 1 | 1 | 24 | 2 | 4 |
| 2 | 1 | 48 | 1 | 14 |
| 3 | 1 | 48 | 2 | 14 |
| 4 | 3 | 24 | 2 | −20 if $k_{SSB} = 0$<br>−21 if $k_{SSB} > 0$ |

TABLE 11-continued

| Index | Multiplexing pattern | $N_{RB}^{CORESET}$ | $N_{symb}^{CORESET}$ | offset |
|---|---|---|---|---|
| 5 | 3 | 24 | 2 | 24 |
| 6 | 1, 2, and 3 (Second CORESET0 is 3) | 24 and 48 (Second CORESET0 is 48) | 1, 2, and 3 (Second CORESET0 is 2) | 14, 24, −20, and −21 (Second CORESET0 is −20 if $k_{SSB} = 0$ −21 if $k_{SSB} > 0$) |
| 7 | 1, 2, and 3 (Second CORESET0 is 3) | 24 and 48 (Second CORESET0 is 48) | 1, 2, and 3 (Second CORESET0 is 2) | 14, 24, −20, and −21 (Second CORESET0 is 48) |
| 8 | Reserved | | | |
| 9 | Reserved | | | |
| 10 | Reserved | | | |
| 11 | Reserved | | | |
| 12 | Reserved | | | |
| 13 | | | | Reserved |
| 14 | | | | Reserved |
| 15 | | | | Reserved |

Different configuration information of the first CORESET0 and the second CORESET0 is compared in Table 11. In the case where the indexes sent by the base station are indexes 6 and 7, for existing configuration information (or the second CORESET0) corresponding to the indexes 6 and 7 that cannot be acquired by the first type terminal due to a bandwidth limitation (for example, 100 MHz), the first terminal may acquire correct CORESET0 configuration information corresponding to the indexes 6 and 7 based on Table 11, so as to ensure smooth access to the network, and the second type terminal can acquire the CORESET configuration information corresponding to the indexes 6 and 7 based on the second CORESET0 configuration table stored by the second type terminal itself, that is, configuration information marked in Table 11. In this manner, when the base station sends the indexes, the first type terminal and the second type terminal can both acquire configuration information corresponding to the indexes.

In an embodiment, the configuration information of the first CORESET0 in Table 11 is only an exemplary presentation, and does not limit the specific content of the configuration information of the first CORESET0.

Exemplarily, it is assumed that the configuration information of indexes 6 to 11 in Table 11 is described in Table 12.

TABLE 12

| Index | Multiplexing pattern | $N_{RB}^{L\_CORESET}$ | $N_{symb}^{L\_CORESET}$ | offset |
|---|---|---|---|---|
| 6 | 1 | 48 | 1 | 14 |
| 7 | 1 | 48 | 2 | 14 |

Figure 7:
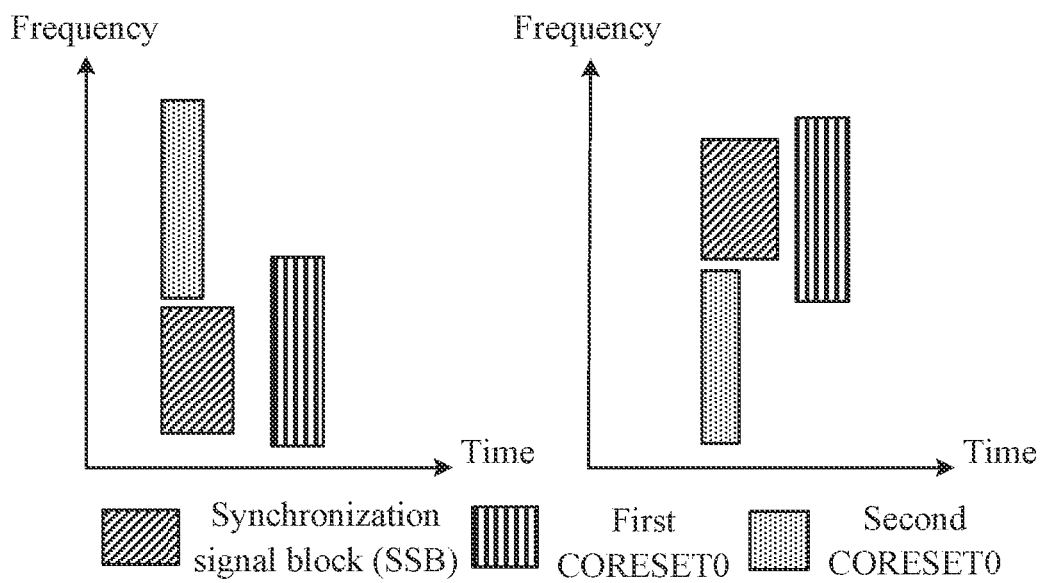
FIG. 7 is a schematic diagram of a relative positional relationship between an SSB and each of a first CORESET0 and a second CORESET0 according to an embodiment.

In an example of Table 12, in the case where the SSB and the first CORESET0 are the multiplexing pattern 1, the bandwidth satisfies the first CORESET0 configuration of 48 RBs so that configuration of 48 RBs relative to 24 RBs can provide the first CORESET0 with a larger bandwidth, and the configurations of 1 symbol and 2 symbols achieve configuration flexibility. In addition, the frequency domain offset configuration of 14 RBs may make the frequency domain position configuration of the first CORESET0 satisfy the principle that the frequency center positions of the first CORESET0 and the SSB are aligned as much as possible. FIG. 7 provides two possible relative positional relationships between the SSB and the first CORESET0 and between the SSB and the second CORESET0 in an example of Table 12.

Optionally, the configuration information of the indexes 6 and 7 in Table 11 may also be described in Tables 13, 14, and 15.

TABLE 13

| Index | Multiplexing pattern | $N_{RB}^{L\_CORESET}$ | $N_{symb}^{L\_CORESET}$ | offset |
|---|---|---|---|---|
| 6 | 2 | 24 | 2 | −20 if $k_{SSB} = 0$ |
|   |   |   |   | −21 if $k_{SSB} > 0$ |
| 7 | 2 | 24 | 2 | 24 |

TABLE 14

| Index | Multiplexing pattern | $N_{RB}^{L\_CORESET}$ | $N_{symb}^{L\_CORESET}$ | offset |
|---|---|---|---|---|
| 6 | 3 | 24 | 2 | 24 |
| 7 | 3 | 24 | 2 | −20 if $k_{SSB} = 0$ |
|   |   |   |   | −21 if $k_{SSB} > 0$ |

TABLE 15

| Index | Multiplexing pattern | $N_{RB}^{L\_CORESET}$ | $N_{symb}^{L\_CORESET}$ | offset |
|---|---|---|---|---|
| 6 | 2 | 24 | 2 | 24 |
| 7 | 2 | 24 | 2 | −20 if $k_{SSB} = 0$ |
|   |   |   |   | −21 if $k_{SSB} > 0$ |

Figures 8, 9:
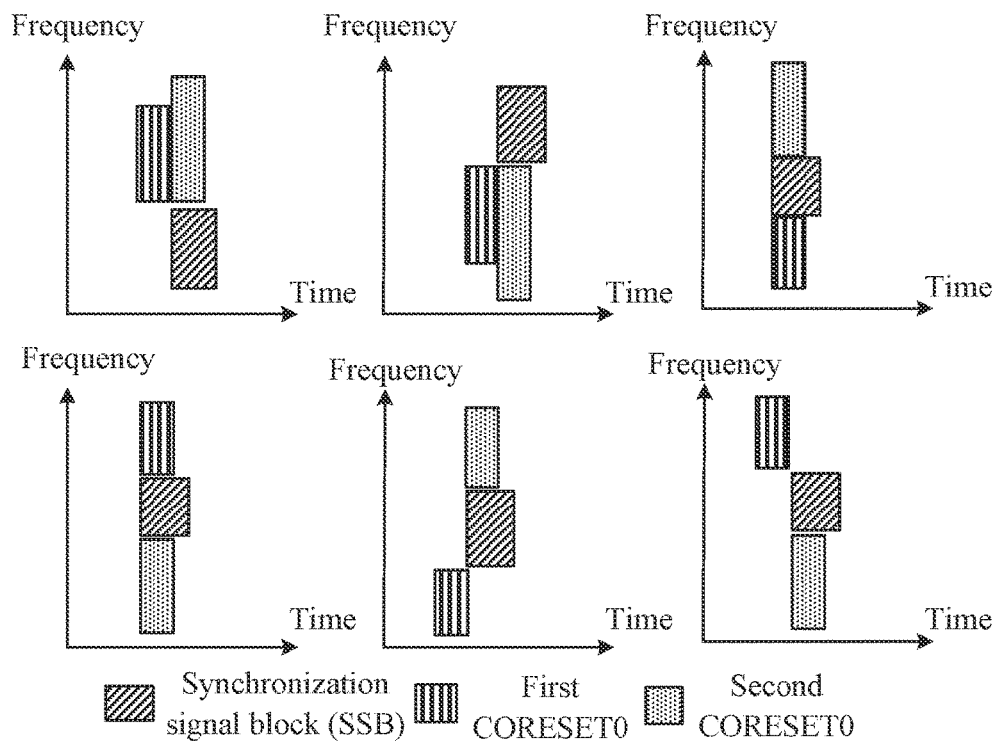
FIG. 8 is a schematic diagram of a relative positional relationship between an SSB and a first CORESET0 and a second CORESET0 according to an embodiment.
FIG. 9 is a schematic diagram of slots occupied by search spaces of a first type terminal and a second type terminal according to an embodiment.

The multiplexing pattern of the first CORESET0 and the SSB provided in examples in Tables 13 to 15 is 2 or 3 so that less time domain resources can be occupied, and such a configuration can make the synchronization delay lower; and at the same time, the frequency domain offset configuration of the first CORESET0 and the SSB can ensure that the first CORESET0 and the second CORESET0 do not affect each other. FIG. 8 provides several possible relative positional relationships between the SSB and the first CORESET0 and between the SSB and the second CORESET0 in examples of Tables 13 to 15.

In addition, a time-frequency resource block for the terminal to detect the PDCCH and a time domain position (also referred to as a monitoring occasion (MO)) for the PDCCH detection are defined in the CORESET0, where the time domain position is indicated by search space configuration information. The search space of Type0 PDCCH, also referred to as search space zero (SS0), may be indicated by a 4-bit indication field in the MIB. Table 16 is a schematic table indicating the search space 0 in the case where the multiplexing pattern of the SSB and the CORESET0 is 1.

TABLE 16

| Index | O | Number P of search spaces in each slot | M | Starting symbol index S |
|---|---|---|---|---|
| 0 | 0 | 1 | 1 | 0 |
| 1 | 0 | 2 | ½ | {0, if i is an even number}, $N_{symb}^{CORESET}$, if i is an odd number} |
| 2 | 2 | 1 | 1 | 0 |
| 3 | 2 | 2 | 12 | {0, if i is an even number}, $N_{symb}^{CORESET}$, if i is an odd number} |
| 4 | 5 | 1 | 1 | 0 |
| 5 | 5 | 2 | 12 | {0, if i is an even number}, $N_{symb}^{CORESET}$, if i is an odd number} |
| 6 | 7 | 1 | 1 | 0 |
| 7 | 7 | 2 | 12 | {0, if i is an even number}, $N_{symb}^{CORESET}$, if i is an odd number} |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

As described in Table 16, the 4-bit indication field in the MIB is used for indicating indexes 0 to 15, each index corresponds to one search space configuration, and each configuration includes the following contents in four aspects: parameters O and M used for calculating a slot index where the MO is located, the number P of search spaces in each slot, and the starting symbol index S, where the parameters O and M are well-known parameters in the art and used for controlling the slot used by the search space.

The second type terminal may acquire the configuration information of the search space 0 according to indication of the 4 bit information. In the case where relationships between the first CORESET0 and the SSB and between the second CORESET0 and the SSB are that different symbols are occupied by the SSB and the corresponding one of the first or second CORESET0 in the time domain and the corresponding one of the first or second CORESET0 contains the SSB in the frequency domain, the first type terminal may determine the time domain position of the search space of the first type terminal according to the search space of the second type terminal and may also determine the time domain position of the search space of the first type terminal according to the position of the SSB.

Optionally, the first type terminal may determine the time domain position of the search space of the first type terminal according to the position of the SSB, or according to the position of the SSB and an offset. The search space of the first type terminal may be adjacent to the SSB in the time domain, for example, may be in front of the SSB, or may be behind the SSB. The offset may be a slot-level offset or a symbol-level offset, and the offset may be positive or negative.

Optionally, the first type terminal may determine the time domain position of the search space of the second type terminal according to the search space configuration information of the second type terminal and determine the time domain position of the search space of the first type terminal according to the time domain position of the search space of the second type terminal or the time domain position and the offset of the search space of the second type terminal. The search space of the first type terminal may be immediately adjacent to the search space of the second type terminal, for example, may be in front of or behind the search space of the second type terminal. The offset may be a slot-level offset or a symbol-level offset, and the offset may be positive or negative.

In the preceding manner, the slot-level offset may be understood as an offset between a slot where the search space of the second type terminal corresponding to the SSB with an index of 0 is located and a slot where the search space of the first type terminal is located.

Exemplarily, in the case where the offset is a slot-level offset, for the SSB with index i, slots where the search space of the second type terminal is located are two consecutive slots with an initial label $n_0=(O \cdot 2^\mu + \lfloor i \cdot M \rfloor) \bmod N_{slot}^{frame,\mu}$, where $N_{slot}^{frame,\mu}$ denotes the number of slots included in each frame for subcarrier interval configuration u, and the value of u may be 0, 1, 2, and 3, corresponding to subcarrier intervals of 15 KHz, 30 KHz, 60 KHz, and 120 KHz, respectively. The first type terminal can calculate slot resources that all search spaces of the second type terminal need to occupy according to the parameters O and M and the maximum number $L_{max}$ of SSBs in one period, and then a slot-level offset (offset_slot) is performed according to a calculation result, so as to determine the time domain position of the search space of the first type terminal.

In an embodiment, the slot-level offset further needs to satisfy at least a condition described below.

$$\text{offset\_slot} \geq \begin{cases} L_{max} + M, M = 1, 2 \\ L_{max} - 1, M = \frac{1}{2} \end{cases}.$$

On the basis of satisfying the preceding condition, the slot occupied by the search space of the first type terminal may be immediately adjacent to the slot occupied by the search space of the second type terminal, that is, within one SSB period, a starting slot of the search space of the first type terminal corresponding to the first SSB is immediately adjacent to the last slot occupied by the search space of the second type terminal corresponding to the last SSB. Such a design not only does not affect the PDSCH configuration flexibility of the second type terminal, but also may complete the synchronization of the first type terminal as soon as possible.

In addition to the preceding method, the slot occupied by the search space of the first type terminal may also start from any slot among slots not used by the second type terminal.

In addition, for the slots except for the starting slot, a first type terminal search space configuration information parameter $M_L$, the number $P_L$ of the search spaces of the first type terminal in each slot, and a starting symbol index $S_L$ of the first type terminal may be the same as or different from configuration information of the second type terminal in the corresponding index. The value of $P_L$ may be 1 or 2, and the value of $M_L$ may be 1 or ½. In the case where the value of $M_L$ is 1, the value of $S_L$ may be any integer value from 0 to 13, for example, 0, 1, 2, and 7; and in the case where the value of $M_L$ is ½, the value of $S_L$ may be {0, if i is an even number; $N_{symb}^{L\_CORESER}$, if i is an odd number} or {0, if i is an even number; 7, if i is an odd number}, where i denotes an SSB index.

Exemplarily, in the case where a value of the maximum number $L_{max}$ of SSBs in one period is 4, the parameter O is 0, and M is 1, slots occupied by the search space of the second type terminal corresponding to the four SSBs in the period are slots 0 to 4. In this case, the first type terminal may start from slot 5 which is used as the starting slot of the search space of the first type terminal corresponding to the SSB with an index of 0, that is, offset_slot=5 at this time. Let other parameters satisfy $M_L=1$ and $P_L=1$, and a corresponding situation is shown in FIG. 9.

Figures 10, 11, 12:
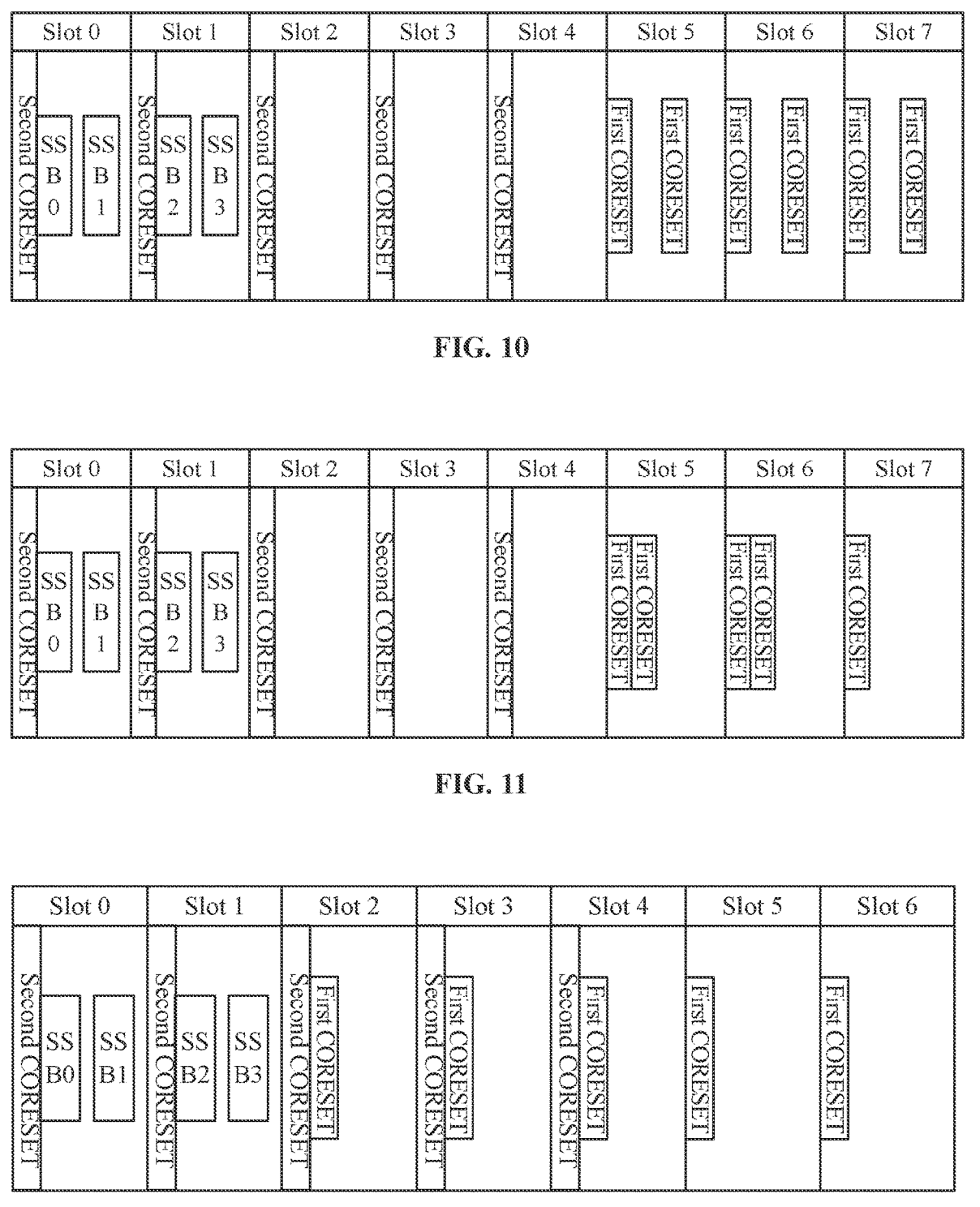

Optionally, in the case where the parameter $M_L=½$, $P_L=2$, and $S_L$ is {0, if i is an even number; 7, if i is an odd number} or {0, if i is an even number; $N_{symb}^{L\_CORESER}$, if i is an odd number}, a corresponding situation is shown in FIG. 10 or 11.

Exemplarily, in the case where the offset is a symbol-level offset, slots where the search space of the first type terminal is located and slots where the search space of the second type terminal is located overlap. If the slots where the search space of the first type terminal is located are defined as two consecutive slots with an initial label $n_0=(O_L \cdot 2^\mu + \lfloor i \cdot M \rfloor) \bmod N_{slot}^{frame,\mu}$, that is, the first type terminal acquires the same parameter M as the second type terminal, the parameter $O_L$ that determines the starting slot of the search space may be the same as or different from the second type terminal parameter O. This situation depends on a specific value of the second type terminal parameter O and the time domain position of the SSB, that is, the value of $O_L$ needs to ensure that the search space of the first type terminal does not overlap with the SSB, and then a symbol-level offset is achieved through difference between starting symbol indexes $S_L$ and S, that is, an offset offset_symbol exists between the starting symbol index $S_L$ of the search space of the first type terminal and the starting symbol index S of the search space of the second type terminal. The offset satisfies a formula: $S_L=S+$offset_symbol, and the offset needs to satisfy a condition: offset_symbol$\geq N_{symb}^{CORESER}$, where $N_{symb}^{CORESET}$ denotes the number of symbols occupied by the second CORESET0, that is, the offset needs to ensure the search spaces of the first type terminal and the second type terminal in the same slot do not overlap. Of course, in the same slot, the search space of the first type terminal may be immediately adjacent to the search space of the second type terminal or may occupy any symbol not occupied by the search space of the second type terminal.

Exemplarily, it is assumed that the value of the maximum number $L_{max}$ of SSBs in one period is 4, the values of the parameters O and M are 0 and 1, respectively, and the starting symbol index S of the search space of the second type terminal is equal to 0. FIG. 12 shows the case where $O_L=2$ and offset_symbol$\geq N_{symb}^{CORESET}$. In this manner, the overlap of the first CORESET0 with the SSB and the second CORESET0 can be avoided, that is, in this case, the search spaces of the first type terminal and the second type terminal in the same slot are immediately adjacent to each other.

Optionally, in the case where the value of $L_{max}$ is 4, the values of the parameters O and M are 2 and 1, respectively, and the starting symbol index S=0, then the value of $O_L$ is the same as the value of the parameter O. FIG. 13 shows the case where $O_L=O=^2$ and $S_L=S+$offset_symbol=0+offset_symbol=offset_symbol$\geq N_{symb}^{CORESET}$.

In addition, for the case where for the same SSB, the first CORESET0 may be in front of the second CORESET0 and the first CORESET0 and the second CORESET0, as shown in FIG. 14, the maximum number of SSBs in one period is 4, and the parameters O=2, M=1, S=0, $O_L=O-1$, and $S_L=S+$offset_symbol=0+offset_symbol=12.

In another example, in the case where the first CORESET0 and the SSB occupy different symbols in the time domain, the first CORESET0 includes the SSB in the frequency domain, and the second CORESET0 and the SSB occupy different resources in the frequency domain, then the second CORESET0 has a fixed relative position with the SSB. In this case, the 4-bit indication field carried in the MIB for indicating the configuration information of the search space 0 of the second type terminal is not used, and the indication field is used for indicating the configuration information of the search space 0 of the first type terminal. The first type terminal determines position information of the first CORESET0 according to the configuration information of the search space 0, where the configuration information of the search space 0 indicates time domain position configuration parameters of the first CORESET0, for example, $O_L$, $M_L$, $P_L$, and $S_L$, so that the first type terminal acquires a CORESET0 time domain position of the first type terminal, and specific indication information may indicate the specific configuration of each index corresponding to 4 bits in a form of a table. The table may be the same as the CORESET0 indication information schematic table of the second type terminal, or a new form may be designed.

In an example, in the case where the first CORESET0 and the SSB occupy different resources in the frequency domain, the search space of the first type terminal has a fixed relative position with the SSB, and no signaling is required.

In addition, the determination of the time domain position of the first CORESET0 by the first type terminal according to the second CORESET0 and the PDCCH configuration signaling may be implemented in optional manners described below.

In a first manner, in the case where the PDCCH configuration signaling indicates that a relationship between the second CORESET0 and the SSB is that the second CORESET0 and the SSB occupy different symbols in the time domain and the second CORESET0 includes the SSB in the frequency domain, then a relationship between the first CORESET0 and the SSB is that the first CORESET0 and the SSB occupy different symbols in the time domain and the first CORESET0 includes the SSB in the frequency domain.

In a second manner, in the case where the PDCCH configuration signaling indicates that the relationship between the second CORESET0 and the SSB is that the second CORESET0 and the SSB occupy different resources in the frequency domain, the relationship between the first CORESET0 and the SSB is that the first CORESET0 and the SSB occupy different resources in the frequency domain.

In an example, the first type terminal determines, according to first access indication information in the MIB, whether a current cell supports an access of the first type terminal. The first access indication information may be one of cases described below.

The first access indication information is an existing cell barred indication (cellBarred) in the MIB. In this case, both the first type terminal and the second type terminal determine, according to the cell barred indication (cellBarred), whether the first type terminal and the second type terminal can access the current cell.

Alternatively, the first access indication information occupies 1 bit of information reserved in the MIB and is used for indicating whether the first type terminal can access the current cell, and the cell barred indication (cellBarred) is used for indicating whether the second type terminal can access the current cell. For example, if the first access indication information is "1", it represents that the first type terminal is allowed to access the current cell, and if the first access indication information is "0", it represents that the first type terminal is forbidden to access the current cell; or if the first access indication information is "0", it represents that the first type terminal is allowed to access the current cell; and if the first access indication information is "1", it represents that the first type terminal is forbidden to access the current cell.

In an example, the first type terminal determines, according to an access indication information field in a downlink control information format 1_0 (DCI format 1_0), whether the current cell supports the access of the first type terminal. The cell barred indication (cellBarred) in the MIB is only used for indicating whether the second type terminal is allowed to access the current cell, that is, the first type terminal may ignore the cell barred indication (cellBarred) in the MIB and determine, only according to the access indication information field in the DCI format 10, whether the current cell is accessible.

Alternatively, the first type terminal determines whether the current cell supports the access of the first type terminal according to whether the current cell is configured with the first CORESET0.

The DCI corresponding to the access indication information is transmitted in the first CORESET0, and the DCI is scrambled by a system information-radio network temporary identity (SI-RNTI).

In an example, the access indication information field is used for indicating whether the current cell supports the access of the first type terminal. For example, in the case where the network is configured such that the first CORESET0 and the second CORESET0 coexist, if the first type terminal may acquire the first CORESET0 according to the PDCCH configuration signaling in the MIB, the first type terminal considers the cell to be an accessible cell; if only CORESET0 is configured in the network, and the CORESET0 is not applicable to the first type terminal, then the first type terminal considers the cell to be an inaccessible cell.

In an example, the DCI format 1_0 scrambled by the SI-RNTI includes the access indication information of the first type terminal and the second type terminal. An information field in the DCI format 1_0 scrambled by the SI-RNTI includes at least one of the following:
  frequency domain resource assignment,
  time domain resource assignment,
  virtual-resource-block-to-physical-resource-block (VRB-to-PRB) mapping,
  a modulation and coding scheme,
  a redundancy version,
  a system information indicator, or
  reserved bits.

The reserved bits occupy 15 bits. If only CORESET0 is configured in the network and the CORESET0 can be applicable to both the first type terminal and the second type terminal, the DCI format 1_0 corresponding to the access indication information is included in the CORESET0, and information included in the DCI format 1_0 scrambled by the SI-RNTI applicable to both the first type terminal and the second type terminal is at least one of the following:
  frequency domain resource assignment,
  time domain resource assignment,
  VRB-to-PRB mapping,
  a modulation and coding scheme,
  a redundancy version,
  a system information indicator,
  access indication information of the first type terminal, or
  reserved bits.

Both the first type terminal and the second type terminal may receive the DCI format 1_0 scrambled by the SI-RNTI, but the first type terminal access indication is only effective for the first type terminal, and the second type terminal does not interpret this information field. The access indication information of the first type terminal occupies the originally reserved bits, which may be 1 bit of signaling overhead. For example, "1" represents that the access of the first type terminal is supported, and "0" represents that the access of the first type terminal is not supported; or "0" represents that the access of the first type terminal is supported, and "1" represents that the access of the first type terminal is not supported. Of course, whether the access indication information field exists may also be used for indicating whether the access of the first type terminal is supported. For example, if the access indication information field exists, it represents that the access of the first type terminal is supported; and if the access indication information field does not exist, it represents that the access of the first type terminal is not supported, and in this case, the reserved bits occupy 14 bits. The access indication information field may also occupy 2 bits of signaling overhead, so as to be applicable to the case where the first type terminal is further divided into terminal types. The specific indication manners include the following cases: for example, "11" represents that access of all first type terminals is supported, "01" represents that access of a type A terminal among the first type terminals is supported, "10" represents that access of a type B terminal among the first type terminals is supported, and "00" represents that access of any first type terminal is not supported, and in this case, the reserved bits occupy 13 bits. The type A and type B represent different types of terminals among the first type terminals that are further divided according to terminal capabilities.

In an example, the DCI format 1_0 scrambled by the SI-RNTI includes the access indication information of the first type terminal. The DCI format 1_0 corresponding to the access indication information is included in the first CORESET0 or the second CORESET0, and information included in the DCI format 10 including the access indication information is at least one of the following:
  frequency domain resource assignment,
  time domain resource assignment,
  VRB-to-PRB mapping,
  a modulation and coding scheme,
  a redundancy version,
  a system information indicator,
  access indication information of the first type terminal, or reserved bits.

The access indication information of the first type terminal occupies the originally reserved bits, which may be 1 bit of signaling overhead. For example, "1" represents that the access of the first type terminal is supported, and "0" represents that the access of the first type terminal is not supported; or "0" represents that the access of the first type terminal is supported, and "1" represents that the access of the first type terminal is not supported. In an embodiment, whether the access indication information field (including the access indication information) exists may also be used for indicating whether the access of the first type terminal is supported. For example, if the access indication information field exists, it represents that the access of the first type terminal is supported; and if the access indication information field does not exist, it represents that the access of the first type terminal is not supported, and in this case, the reserved bits occupy 14 bits. The access indication information field may also occupy 2 bits of signaling overhead, so as to be applicable to the case where the first type terminal is further divided into terminal types. The specific indication manners include the following cases: for example, "11" represents that access of all first type terminals is supported, "01" represents that access of a type A terminal among the first type terminals is supported, "10" represents that access of a type B terminal among the first type terminals is supported, and "00" represents that access of any first type terminal is not supported, and in this case, the reserved bits occupy 13 bits. The type A and type B represent different types of terminals among the first type terminals that are further divided according to terminal capabilities.

In an example, the first type terminal determines, according to the first access indication information in the MIB, whether the current cell supports the access of the first type terminal, where the first access indication information is the existing cell barred indication (cellBarred) in the MIB. In this case, the DCI format 1_0 scrambled by the SI-RNTI also includes the access indication information of the first type terminal. If the first access indication information in the MIB prohibits the first type terminal from accessing the current cell, the first type terminal does not access the current cell; if the first access indication information allows the first type terminal to access the current cell, the first type terminal determines whether to access the current cell according to the access indication information of the first type terminal in the DCI format 1_0.

In an example, the first type terminal determines a situation of a system message corresponding to the first type terminal according to a first short information field (including first short information) in the DCI format 1_0.

DCI corresponding to the first short information is transmitted in the first CORESET0, and the DCI is scrambled by a paging-radio network temporary identity (P-RNTI).

Alternatively, the DCI corresponding to the first short information is transmitted in the first CORESET0, the DCI is scrambled by the P-RNTI, and the first short information and second short information are transmitted in the same DCI, where the second short information is used for determining a situation of a system message corresponding to the second type terminal.

In an example, the DCI format 1_0 scrambled by the P-RNTI includes paging message indications of the first type terminal and the second type terminal, and an information field in the DCI format 1_0 scrambled by the P-RNTI includes at least one of the following:
  a short messages indicator,
  short messages,
  frequency domain resource assignment,
  time domain resource assignment,
  VRB-to-PRB mapping,
  a modulation and coding scheme,
  transmission block (tb) scaling, or
  reserved bits.

The reserved bits occupy 6 bits. The short messages include a system information modification (systemInfoModification) indication, and the information indicates broadcast control channel modification (BCCH modification) of the second type terminal except for SIB6, SIB7 and SIB8.

If only CORESET0 is configured in the network and the CORESET0 may be applicable to both the first type terminal and the second type terminal, the DCI format 1_0 scrambled by the P-RNTI in the CORESET0 also includes the system information modification indication of the first type terminal, and an information field that is included in the DCI format 1_0 scrambled by the P-RNTI and is applicable to both the first type terminal and the second type terminal is at least one of the following:

A short messages indicator;
Short messages;
A system information modification indication of the first type terminal; or
Reserved bits.

Alternatively, the information field that is included in the DCI format 1_0 scrambled by the P-RNTI and is applicable to both the first type terminal and the second type terminal is at least one of the following:
A short messages indicator;
Second short messages (applied to the second type terminal);
First short messages (applied to the first type terminal); or
Reserved bits.

Alternatively, the information field that is included in the DCI format 1_0 scrambled by the P-RNTI and is applicable to both the first type terminal and the second type terminal is at least one of the following:
A short messages indicator;
Short messages; or
Reserved bits.

In this case, the system information modification indication of the first type terminal is included in the short messages, and the reserved bits in the short messages are used.

If both the first CORESET0 and the second CORESET0 are configured in the network, the system information modification indication or the short messages applied to the first type terminal is included in the DCI format 1_0 scrambled by the P-RNTI in the first CORESET0 or the second CORESET0.

The system information modification indication of the first type terminal occupies the originally reserved bits in the DCI format 1_0 or occupies the reserved bits in the short messages applied to the second type terminal, and the system information modification indication of the first type terminal indicates BCCH modification except for SIB6, SIB7 and SIB8 or indicates BCCH modification including SIB6, SIB7 and SIB8. The system information modification indication is 1 bit of overhead. For example, the bit is "1" to indicate the modification, or the bit is "0" to indicate the modification. Whether the bit exists may also be used for indicating whether the modification occurs. For example, the bit "exists" to indicate the modification, or the bit "does not exist" to indicate the modification. Alternatively, the system information modification indication of the first type terminal is 2 bits of overhead, so as to be applicable to the case where the first type terminal is further divided into terminal types, and the specific indication manners include the following cases: for example, "11" indicates system information modification of all first type terminals, "10" indicates system information modification of a type A terminal among the first type terminals, "01" indicates system information modification of a type B terminal among the first type terminals, and "00" indicates no system information modification of all the first type terminals. The type A and type B represent different types of terminals among the first type terminals that are further divided according to terminal capabilities.

Optionally, the first short messages may be used for at least indicating whether the system message corresponding to the first type terminal is changed. The size of the first short message may be the same as the size of the second short message or may be less than the size of the second short message. For example, the first short messages include only whether the system message corresponding to the first type terminal is changed, or a type of the SIB carried by the PDSCH indicated by the DCI and whether the system message corresponding to the first type terminal is changed.

FIG. 15 is a flowchart of an information configuration method, and the method may be applied to a base station. As shown in FIG. 15, the method specifically includes the following.

In S1501, a base station sends PDCCH configuration signaling corresponding to SIB1 in an MIB.

The PDCCH configuration signaling is used for indicating configuration information of first CORESET0 corresponding to a first type terminal, where the PDCCH configuration signaling corresponding to the SIB1 in the MIB corresponds to a second CORESET0 corresponding to a second type terminal.

The second CORESET0 is the same as the first CORESET0 in the case where the second CORESET0 is applicable to the first type terminal. On the contrary, if the second CORESET0 is not applicable to the first type terminal, the first type terminal acquires, according to the PDCCH configuration signaling corresponding to the SIB1 in the MIB, the configuration information of the first CORESET0.

Optionally, in the case where the second CORESET0 and an SSB occupy different symbols in a time domain and the second CORESET0 includes the SSB in a frequency domain, the base station configures the first CORESET0 such that the first CORESET0 and the SSB occupy different symbols in the time domain and the first CORESET0 includes the SSB in the frequency domain, where a positional relationship between the configured first CORESET0 and the second CORESET0 includes the following.

The first CORESET0 and the second CORESET0 are configured to be adjacent in the time domain, for example, the first CORESET0 is in front of or behind the second CORESET0.

Alternatively, the first CORESET0 and the second CORESET0 are configured in a non-adjacent relationship in the time domain, and an offset exists between the first CORESET0 and the second CORESET0, where the offset may be positive or negative.

In another example, in the case where the second CORESET0 and an SSB occupy different symbols in a time domain and the second CORESET0 includes the SSB in a frequency domain, the base station configures the first CORESET0 such that the first CORESET0 and the SSB occupy different symbols in the time domain and the first CORESET0 includes the SSB in the frequency domain, where a time domain positional relationship between the configured first CORESET0 and the SSB includes the following.

The first CORESET0 is adjacent to the SSB in the time domain, for example, the first CORESET0 may be in front of or behind the SSB.

Alternatively, an offset exists between the first CORESET0 and the SSB, where the offset may be positive or negative.

In an example, in the case where the second CORESET0 and an SSB occupy different symbols in a time domain and the second CORESET0 includes the SSB in a frequency domain, the base station configures the first CORESET0 such that the first CORESET0 and the SSB occupy different resources in the frequency domain and the first CORESET0 has a fixed relative position with the SSB.

In an embodiment, in the case where the second CORESET0 and an SSB occupy different resources in a frequency domain, the base station configures the first CORESET0 such that the first CORESET0 and the SSB occupy different symbols in a time domain and the first CORESET0 includes the SSB in the frequency domain, and the base station indicates position information of the first CORESET0 through configuration information of search space 0, where the configuration information of the search space 0 is part information of PDCCH configuration information corresponding to the SIB1 in the MIB.

In an example, in the case where the second CORESET0 and an SSB occupy different resources in a frequency domain, the base station configures the first CORESET0 such that the first CORESET0 and the SSB occupy different resources in the frequency domain and the first CORESET0 has a fixed relative position with the SSB.

In addition, the base station configures the first CORESET0 to be associated with the second CORESET0, where configuration manners include two manners described below.

In the case where the second CORESET0 and an SSB occupy different symbols in a time domain and the second CORESET0 includes the SSB in a frequency domain, the base station configures the first CORESET0 such that the first CORESET0 and the SSB occupy different symbols in the time domain and the first CORESET0 includes the SSB in the frequency domain.

Alternatively, in the case where the second CORESET0 and the SSB occupy different resources in the frequency domain, the base station configures the first CORESET0 such that the first CORESET0 and the SSB occupy different resources in the frequency domain.

In an embodiment, parameters configured by the base station for the first CORESET0 and the second CORESET0 are different, where the configured parameters being different includes at least one of the following: CORESET0s and an SSB being different in relative positions, a number of resource blocks (RBs) occupied by the CORESET0s being different, a number of symbols occupied by the CORESET0s being different, or frequency domain offsets between the CORESET0s and the SSB being different; where the frequency domain offsets represent offsets between the CORESET0s and a frequency domain lower boundary of the SSB, the RBs of the CORESET0s are used as units, a downward offset is expressed as positive, and an upward offset is expressed as negative; and a bandwidth of the first CORESET0 configured by the base station satisfies a bandwidth capability of the first type terminal.

Exemplarily, the configured parameters being different further includes at least one of the following.

In the case where the first type terminal supports a 10 MHz bandwidth in frequency range 1 or supports a 50 MHz bandwidth in frequency domain range 2, the base station may configure the first CORESET0 to be at least one of the following.

In the case where a subcarrier interval of the first CORESET0 and a subcarrier interval of the SSB are both 15 KHz, the first CORESET0 and the SSB occupy different symbols in a time domain, the first CORESET0 includes the SSB in a frequency domain, the first CORESET0 occupies 48 RBs, the number of symbols occupied in the time domain is at least one of 1, 2, or 3, and a frequency domain offset from the SSB is at least one of 12 RBs, 14 RBs, or 16 RBs; or the first CORESET0 and the SSB occupy different resources in the frequency domain, the first CORESET0 occupies 24 RBs, the number of symbols occupied in the time domain is at least one of 2 or 3, and a frequency domain offset from the SSB is at least one of 24 RBs, −20 RBs, or −21 RBs; or any combination of the preceding two situations is configured, and a combination of different situations is achieved through different index values indicated by CORESET0 configuration information.

Alternatively, in the case where a subcarrier interval of the first CORESET0 and a subcarrier interval of the SSB are 30 KHz and 15 KHz, respectively, the first CORESET0 and the SSB occupy different symbols in the time domain, the first CORESET0 includes the SSB in the frequency domain, the first CORESET0 occupies 24 RBs, the number of symbols occupied in the time domain is at least one of 1, 2, or 3, and a frequency domain offset from the SSB is at least one of 5 RBs to 8 RBs.

Alternatively, in the case where a subcarrier interval of the first CORESET0 and a subcarrier interval of the SSB are both 30 KHz, the first CORESET0 and the SSB occupy different symbols in the time domain, the first CORESET0 includes the SSB in the frequency domain, the first CORESET0 occupies 24 RBs, the number of symbols occupied in the time domain is at least one of 1, 2, or 3, and a frequency domain offset from the SSB is at least one of 0 RBs to 4RBs.

Alternatively, in the case where a subcarrier interval of the first CORESET0 and a subcarrier interval of the SSB are 15 KHz and 30 KHz, respectively, the first CORESET0 and the SSB occupy different symbols in the time domain, the first CORESET0 includes the SSB in the frequency domain, the first CORESET0 occupies 48 RBs, the number of symbols occupied in the time domain is at least one of 1, 2, or 3, and a frequency domain offset from the SSB is at least one of 2 RBs, 4RBs, or 6 RBs.

Alternatively, in the case where a subcarrier interval of the first CORESET0 and a subcarrier interval of the SSB are 60 KHz and 120 KHz, respectively, the first CORESET0 and the SSB occupy different symbols in the time domain, the first CORESET0 includes the SSB in the frequency domain, the first CORESET0 occupies 48 RBs, the number of symbols occupied in the time domain is at least one of 1, 2, or 3, and a frequency domain offset from the SSB is at least one of 0 RBs to 8 RBs.

Alternatively, in the case where a subcarrier interval of the first CORESET0 and a subcarrier interval of the SSB are 120 KHz and 120 KHz, respectively, the first CORESET0 and the SSB occupy different symbols in the time domain, the first CORESET0 includes the SSB in the frequency domain, the first CORESET0 occupies 24 RBs, the number of symbols occupied in the time domain is at least one of 1, 2, or 3, and a frequency domain offset from the SSB is at least one of 0 RBs to 4 RBs.

Alternatively, in the case where the first type terminal supports a 20 MHz bandwidth in the frequency range 1 or supports a 100 MHz bandwidth in the frequency range 2, the base station may configure the first CORESET0 to be at least one of the following.

In the case where a subcarrier interval of the first CORESET0 and a subcarrier interval of the SSB are 60 KHz and 120 KHz, respectively, the first CORESET0 and the SSB occupy different symbols in a time domain, the first CORESET0 includes the SSB in a frequency domain, the first CORESET0 occupies 96 RBs, the number of symbols occupied in the time domain is at least one of 1 or 2, and a frequency domain offset from the SSB is 28 RBs; or the first CORESET0 and the SSB occupy different resources in the frequency domain, the first CORESET0 occupies 48 RBs, one symbol is occupied in the time domain, and a frequency domain offset from the SSB is at least one of 49 RBs, −41 RBs, or −42 RBs; or any combination of the preceding two situations is configured, and a combination of different situations is achieved through different index values indicated by CORESET0 configuration information.

Alternatively, in the case where a subcarrier interval of the first CORESET0 and a subcarrier interval of the SSB are both 120 KHz, the first CORESET0 and the SSB occupy different symbols in the time domain, the first CORESET0 includes the SSB in the frequency domain, the first CORESET0 occupies 48 RBs, the number of symbols occupied in the time domain is at least one of 1 or 2, and a frequency domain offset from the SSB is 14 RBs; or the first CORESET0 and the SSB occupy different resources in the frequency domain, the first CORESET0 occupies 24 RBs, two symbols are occupied in the time domain, and a frequency domain offset from the SSB is at least one of 24 RBs, −20 RBs, or −21 RBs; or any combination of the preceding two situations is configured, and the combination of different situations is achieved through the different index values indicated by the CORESET0 configuration information.

Alternatively, in the case where a subcarrier interval of the first CORESET0 and a subcarrier interval of the SSB are 120 KHz and 240 KHz, respectively, the first CORESET0 and the SSB occupy different resources in the time domain, the first CORESET0 includes the SSB in the frequency domain, the first CORESET0 occupies 48 RBs, the number of symbols occupied in the time domain is at least one of 1 or 2, and a frequency domain offset from the SSB is at least one of 0 RBs, 4 RBs, or 8 RBs; or the first CORESET0 and the SSB occupy different resources in the frequency domain, the first CORESET0 occupies 24 RBs, one symbol is occupied in the time domain, and a frequency domain offset from the SSB is at least one of 25 RBs, −41 RBs, or −42 RBs; or any combination of the preceding two situations is configured, and the combination of different situations is achieved through the different index values indicated by the CORESET0 configuration information.

In addition, in this embodiment, the base station may also send a first access indication of the first type terminal, where the first access indication is carried in the MIB and used for indicating whether a current cell supports an access of the first type terminal. Optionally, the first access indication is an existing cell barred indication (cellBarred) in the MIB, or the first access indication may occupy 1-bit information reserved in the MIB and is used for indicating whether the first type terminal can access the current cell. In the second case, the cell barred indication (cellBarred) is used for indicating whether the second type terminal can access the current cell.

In an example, the base station may also send access control information of the first type terminal, where the access control information of the first type terminal is used for indicating whether the current cell supports the access of the first type terminal, where the access control information of the first type terminal is carried in DCI transmitted in the first CORESET0, a format of the DCI is a DCI format 1_0, and the DCI is scrambled by an SI-RNTI.

In an embodiment, the base station may also send a first access indication of the first type terminal and access control information of the first type terminal, where the first access indication is carried in the MIB, the access control information is carried in DCI transmitted in the first CORESET0, a format of the DCI is a DCI format 1_0, the DCI is scrambled by an SI-RNTI, the first access indication and the access control information jointly indicate whether a current cell supports an access of the first type terminal, and the first access indication is an existing cell barred indication (cellBarred) in the MIB, where in the case where the first access indication is that an access is allowed, the first type terminal determines, according to an access indication information field in the DCI format 1_0, whether to perform accessing; and in the case where the first indication access is that an access is rejected, the first type terminal does not access the current cell.

In an embodiment, the base station may send first short information of the first type terminal, where the first short information of the first type terminal is used for indicating a situation of a system message corresponding to the first type terminal, the first short information is carried in DCI transmitted in the first CORESET0, a format of the DCI is a DCI format 1_0, and the DCI is scrambled by a P-RNTI.

In another embodiment, the base station sends first short information of the first type terminal, where the first short information of the first type terminal is used for indicating a situation of a system message corresponding to the first type terminal, the first short information and second short information are carried in the same DCI transmitted in the first CORESET0, a format of the DCI is a DCI format 1_0, and the DCI is scrambled by a P-RNTI.

Figure 16:
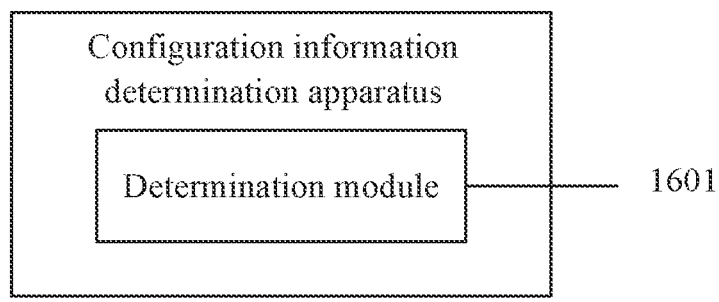
FIG. 16 is a structural diagram of a configuration information determination apparatus according to an embodiment.

FIG. 16 is a structural diagram of a configuration information determination apparatus according to an embodiment of the present application. As shown in FIG. 16, the apparatus may include a determination module 1601.

The determination module is configured to determine, according to PDCCH configuration signaling corresponding to SIB1 in an MIB sent by a base station, configuration information of first CORESET0 corresponding to the configuration information determination apparatus, where the PDCCH configuration signaling corresponding to the SIB1 in the MIB corresponds to a second CORESET0 corresponding to a second type terminal.

The configuration information determination apparatus is different from the second type terminal in at least one of a bandwidth, a cost, complexity, a processing capability, power consumption, or a device size.

In an example, if the second CORESET0 is applicable to the configuration information determination apparatus, the second CORESET0 corresponding to the second type terminal is the same as the first CORESET0 corresponding to the configuration information determination apparatus; or, on the contrary, if the second CORESET0 is not applicable to the configuration information determination apparatus, the determination module in the configuration information determination apparatus acquires the configuration information of the first CORESET0 according to the PDCCH configuration signaling corresponding to the SIB1 in the MIB.

In an example, in the case where the second CORESET0 and the SSB occupy different symbols in the time domain, the second CORESET0 includes the SSB in the frequency domain, the first CORESET0 and the SSB occupy different symbols in the time domain, and the first CORESET0 includes the SSB in the frequency domain, the time domain position relationship of the second CORESET0 and the first CORESET0 may include the following.

The first CORESET0 is adjacent to the second CORESET0 in the time domain.

Alternatively, an offset exists between the first CORESET0 and the second CORESET0.

In another example, in the case where the second CORESET0 and the SSB occupy different symbols in the time domain, the second CORESET0 includes the SSB in the frequency domain, the first CORESET0 and the SSB occupy different symbols in the time domain, and the first CORESET0 includes the SSB in the frequency domain, the time domain positionship of the SSB and the first CORESET0 may include one of two cases described below.

The first CORESET0 is adjacent to the SSB in the time domain.

Alternatively, an offset exists between the first CORESET0 and the SSB.

In an example, in the case where the second CORESET0 and the SSB occupy different symbols in the time domain, the second CORESET0 includes the SSB in the frequency domain, and the first CORESET0 and the SSB occupy different resources in the frequency domain, then the first CORESET0 has a fixed relative position with the SSB.

In an example, in the case where the second CORESET0 and the SSB occupy different resources in the frequency domain, the first CORESET0 and the SSB occupy different symbols in the time domain, and the first CORESET0 includes the SSB in the frequency domain, the determination module in the configuration information determination apparatus determines position information of the first CORESET0 according to configuration information of search space 0, where the configuration information of the search space 0 is part of information of the PDCCH configuration signaling corresponding to the SIB1 in the MIB.

In an example, in the case where the second CORESET0 and the SSB occupy different resources in the frequency domain and the first CORESET0 and the SSB occupy different resources in the frequency domain, the first CORESET0 has a fixed relative position with the SSB.

Optionally, the determination module determines a time domain position of the first CORESET0 according to the second CORESET0 and the PDCCH configuration signaling in manners described below.

In the case where the PDCCH configuration signaling indicates that a relationship between the second CORESET0 and the SSB is that the second CORESET0 and the SSB occupy different symbols in the time domain and the second CORESET0 includes the SSB in the frequency domain, then a relationship between the first CORESET0 and the SSB is that the first CORESET0 and the SSB occupy different symbols in the time domain and the first CORESET0 includes the SSB in the frequency domain.

Alternatively, in the case where the PDCCH configuration signaling indicates that the relationship between the second CORESET0 and the SSB is that the second CORESET0 and the SSB occupy different resources in the frequency domain, the relationship between the first CORESET0 and the SSB is that the first CORESET0 and the SSB occupy different resources in the frequency domain.

In an embodiment, a configuration of the first CORESET0 and a configuration of the second CORESET0 are different, where the configuration of the first CORESET0 and the configuration of the second CORESET0 being different includes at least one of the following: CORESET0s and the SSB being different in relative positions, a number of resource blocks (RBs) occupied by the CORESET0s being different, a number of symbols occupied by the CORESET0s being different, or frequency domain offsets between the CORESET0s and the SSB being different; where the frequency domain offsets represent offsets between the CORESET0s and a frequency domain lower boundary of the SSB, the RBs of the CORESET0s are used as units, a downward offset is expressed as positive, and an upward offset is expressed as negative; and a bandwidth configuration of the first CORESET0 satisfies a bandwidth capability of the configuration information determination apparatus.

In an embodiment, the configuration of the first CORESET0 and the configuration of the second CORESET0 being different specifically include at least one of the following.

In the case where the configuration information determination apparatus supports a 10 MHz bandwidth in frequency range 1 or supports a 50 MHz bandwidth in frequency domain range 2, the first CORESET0 is configured to be at least one of the following: in the case where a subcarrier interval of the first CORESET0 and a subcarrier interval of the SSB are both 15 KHz, the first CORESET0 and the SSB occupy different symbols in a time domain, the first CORESET0 includes the SSB in a frequency domain, the first CORESET0 occupies 48 RBs in the frequency domain, the number of symbols occupied in the time domain is at least one of 1, 2, or 3, and a frequency domain offset from the SSB is at least one of 12 RBs, 14 RBs, or 16 RBs; or the first CORESET0 and the SSB occupy different resources in the frequency domain, the first CORESET0 occupies 24 RBs, the number of symbols occupied in the time domain is at least one of 2 or 3, and a frequency domain offset from the SSB is at least one of 24 RBs, −20 RBs, or −21 RBs; or an index indicated by CORESET0 configuration information in the PDCCH configuration signaling in the MIB includes both the case where the first CORESET0 and the SSB occupy different symbols in the time domain and the first CORESET0 includes the SSB in the frequency domain and the case where the first CORESET0 and the SSB occupy different resources in the frequency domain.

Alternatively, in the case where a subcarrier interval of the first CORESET0 and a subcarrier interval of the SSB are 30 KHz and 15 KHz, respectively, the first CORESET0 and the SSB occupy different symbols in the time domain, the first CORESET0 includes the SSB in the frequency domain, the first CORESET0 occupies 24 RBs, the number of symbols occupied in the time domain is at least one of 1, 2, or 3, and a frequency domain offset from the SSB is at least one of 5 RBs to 8 RBs.

Alternatively, in the case where a subcarrier interval of the first CORESET0 and a subcarrier interval of the SSB are both 30 KHz, the first CORESET0 and the SSB occupy different symbols in the time domain, the first CORESET0 includes the SSB in the frequency domain, the first CORESET0 occupies 24 RBs, the number of symbols occupied in the time domain is at least one of 1, 2, or 3, and a frequency domain offset from the SSB is at least one of 0 RBs to 4RBs.

Alternatively, in the case where a subcarrier interval of the first CORESET0 and a subcarrier interval of the SSB are 15 KHz and 30 KHz, respectively, the first CORESET0 and the SSB occupy different symbols in the time domain, the first CORESET0 includes the SSB in the frequency domain, the first CORESET0 occupies 48 RBs, the number of symbols occupied in the time domain is at least one of 1, 2, or 3, and a frequency domain offset from the SSB is at least one of 2 RBs, 4RBs, or 6 RBs.

Alternatively, in the case where a subcarrier interval of the first CORESET0 and a subcarrier interval of the SSB are 60 KHz and 120 KHz, respectively, the first CORESET0 and the SSB occupy different symbols in the time domain, the first CORESET0 includes the SSB in the frequency domain, the first CORESET0 occupies 48 RBs, the number of symbols occupied in the time domain is at least one of 1, 2, or 3, and a frequency domain offset from the SSB is at least one of 0 RBs to 8 RBs.

Alternatively, in the case where a subcarrier interval of the first CORESET0 and a subcarrier interval of the SSB are both 120 KHz, respectively, the first CORESET0 and the SSB occupy different symbols in the time domain, the first CORESET0 includes the SSB in the frequency domain, the first CORESET0 occupies 24 RBs, the number of symbols occupied in the time domain is at least one of 1, 2, or 3, and a frequency domain offset from the SSB is at least one of 0 RBs to 4 RBs.

Alternatively, in the case where the configuration information determination apparatus supports a 20 MHz bandwidth in the frequency range 1 or supports a 100 MHz bandwidth in the frequency range 2, the first CORESET0 is configured to be at least one of the following: in the case where a subcarrier interval of the first CORESET0 and a subcarrier interval of the SSB are 60 KHz and 120 KHz, respectively, the first CORESET0 and the SSB occupy different symbols in a time domain, the first CORESET0 includes the SSB in a frequency domain, the first CORESET0 occupies 96 RBs, the number of symbols occupied in the time domain is at least one of 1 or 2, and a frequency domain offset from the SSB is 28 RBs; or the first CORESET0 and the SSB occupy different resources in the frequency domain, the first CORESET0 occupies 48 RBs, one symbol is occupied in the time domain, and a frequency domain offset from the SSB is at least one of 49 RBs, −41 RBs, or −42 RBs; or an index indicated by CORESET0 configuration information in the PDCCH configuration signaling in the MIB includes both the case where the first CORESET0 and the SSB occupy different symbols in the time domain and the first CORESET0 includes the SSB in the frequency domain and the case where the first CORESET0 and the SSB occupy different resources in the frequency domain.

Alternatively, in the case where a subcarrier interval of the first CORESET0 and a subcarrier interval of the SSB are both 120 KHz, the first CORESET0 and the SSB occupy different symbols in the time domain, the first CORESET0 includes the SSB in the frequency domain, the first CORESET0 occupies 48 RBs, the number of symbols occupied in the time domain is at least one of 1, 2, or 3, and a frequency domain offset from the SSB is 14 RBs; or the first CORESET0 and the SSB occupy different resources in the frequency domain, the first CORESET0 occupies 24 RBs, two symbols are occupied in the time domain, and a frequency domain offset from the SSB is at least one of 24 RBs, −20 RBs, or −21 RBs; or the index indicated by the CORESET0 configuration information in the PDCCH configuration signaling in the MIB includes both the case where the first CORESET0 and the SSB occupy different symbols in the time domain and the first CORESET0 includes the SSB in the frequency domain and the case where the first CORESET0 and the SSB occupy different resources in the frequency domain.

Alternatively, in the case where a subcarrier interval of the first CORESET0 and a subcarrier interval of the SSB are 120 KHz and 240 KHz, respectively, the first CORESET0 and the SSB occupy different resources in the time domain, the first CORESET0 includes the SSB in the frequency domain, the first CORESET0 occupies 48 RBs, the number of symbols occupied in the time domain is at least one of 1 or 2, and a frequency domain offset from the SSB is at least one of 0 RBs, 4 RBs, or 8 RBs; or the first CORESET0 and the SSB occupy different resources in the frequency domain, the first CORESET0 occupies 24 RBs in the frequency domain, one symbol is occupied in the time domain, and a frequency domain offset from the SSB is at least one of 25 RBs, −41 RBs, or −42 RBs; or the index indicated by CORESET0 configuration information in the PDCCH configuration signaling in the MIB includes both the case where the first CORESET0 and the SSB occupy different symbols in the time domain and the first CORESET0 includes the SSB in the frequency domain and the case where the first CORESET0 and the SSB occupy different resources in the frequency domain.

Optionally, the determination module is further configured to determine whether a current cell supports an access of the configuration information determination apparatus according to an access indication information field in a DCI format 1_0, where DCI corresponding to access indication information is transmitted in the first CORESET0 and scrambled by an SI-RNTI.

Alternatively, whether the current cell supports the access of the configuration information determination apparatus is determined according to whether the current cell is configured with the first CORESET0.

Optionally, the determination module may be configured to ignore a cell barred indication (cellBarred) in the MIB and determine, only according to the access indication information field in the DCI format 1_0, whether the current cell is accessible.

In an example, the determination module may determine whether the current cell supports the access of the configuration information determination apparatus according to a first access indication in the MIB, where the first access indication is an existing cell barred indication (cellBarred) in the MIB or the first access indication may occupy 1-bit information reserved in the MIB.

In an example, the determination module determines, according to a common indication of a first access indication in the MIB and an access indication information field in a DCI format 1_0 scrambled by an SI-RNTI, whether a current cell supports access of the configuration information determination apparatus, where the first access indication is an existing cell barred indication (cellBarred) in the MIB. In the case where the first access indication is that an access is allowed, the determination module determines, according to the access indication information field in the DCI format 1_0, whether to perform accessing; and in the case where the first access indication is that an access is rejected, the configuration information determination apparatus does not access the current cell.

In an example, the determination module is further configured to determine a situation of a system message corresponding to the configuration information determination apparatus according to a first short information field in a DCI format 1_0.

DCI corresponding to first short information is transmitted in the first CORESET0, and the DCI is scrambled by a P-RNTI.

Alternatively, the DCI corresponding to the first short information is transmitted in the first CORESET0, the DCI is scrambled by the P-RNTI, and the first short information and second short information are transmitted in the same DCI, where the second short information is used for determining a situation of a system message corresponding to the second type terminal.

Figure 17:
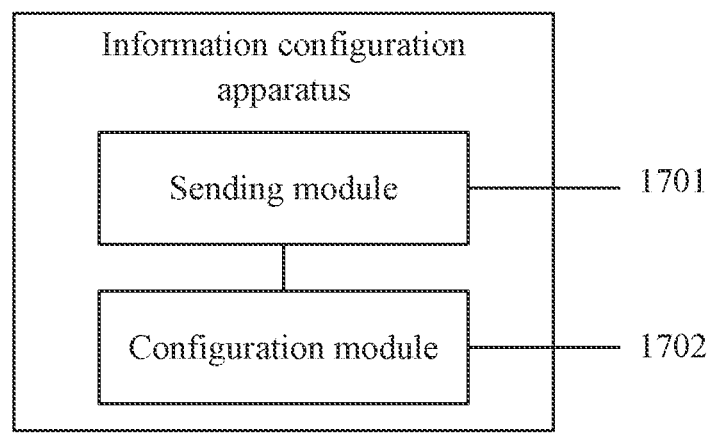
FIG. 17 is a structural diagram of an information configuration apparatus according to an embodiment.

FIG. 17 is a structural diagram of an information configuration apparatus according to an embodiment of the present application. As shown in FIG. 17, the apparatus may include a sending module 1701.

The sending module is configured to send PDCCH configuration signaling corresponding to SIB1 in an MIB.

The PDCCH configuration signaling is used for indicating configuration information of first CORESET0 corresponding to a first type terminal, where the PDCCH configuration signaling corresponding to the SIB1 in the MIB corresponds to a second CORESET0 corresponding to a second type terminal.

The second CORESET0 is the same as the first CORESET0 in the case where the second CORESET0 is applicable to the first type terminal. In the case where the second CORESET0 is not applicable to the first type terminal, the first type terminal acquires, according to the PDCCH configuration signaling corresponding to the SIB1 in the MIB, the configuration information of the first CORESET0.

In an example, in the case where the second CORESET0 and an SSB occupy different symbols in a time domain and the second CORESET0 includes the SSB in a frequency domain, a configuration module 1702 included in the information configuration apparatus configures the first CORESET0 such that the first CORESET0 and the SSB occupy different symbols in the time domain and the first CORESET0 includes the SSB in the frequency domain, where a positional relationship between the configured first CORESET0 and the second CORESET0 includes the following.

The first CORESET0 and the second CORESET0 are configured to be adjacent in the time domain.

Alternatively, the first CORESET0 and the second CORESET0 are configured to be in a non-adjacent relationship in the time domain, and an offset exists between the first CORESET0 and the second CORESET0.

In the case where the second CORESET0 and the SSB occupy different symbols in the time domain and the second CORESET0 includes the SSB in the frequency domain, the configuration module configures the first CORESET0 such that the first CORESET0 and the SSB occupy different symbols in the time domain and the first CORESET0 includes the SSB in the frequency domain, where a time domain positional relationship between the configured first CORESET0 and the SSB includes the following.

The first CORESET0 is adjacent to the SSB in the time domain.

Alternatively, an offset exists between the first CORESET0 and the SSB.

In an example, in the case where the second CORESET0 and the SSB occupy different symbols in the time domain and the second CORESET0 includes the SSB in the frequency domain, the configuration module configures the first CORESET0 such that the first CORESET0 and the SSB occupy different resources in the frequency domain and the first CORESET0 has a fixed relative position with the SSB.

In an embodiment, in the case where the second CORESET0 and the SSB occupy different resources in the frequency domain, the configuration module configures the first CORESET0 such that the first CORESET0 and the SSB occupy different symbols in the time domain and the first CORESET0 includes the SSB in the frequency domain, and the configuration module indicates position information of the first CORESET0 through configuration information of search space 0, where the configuration information of the search space 0 is part information of PDCCH configuration information corresponding to the SIB1 in the MIB.

In an example, in the case where the second CORESET0 and the SSB occupy different resources in the frequency domain, the configuration module configures the first CORESET0 such that the first CORESET0 and the SSB occupy different resources in the frequency domain and the first CORESET0 has a fixed relative position with the SSB.

Optionally, the configuration module configures the first CORESET0 to be associated with the second CORESET0, where a configuration manner includes any of the manners described below.

In the case where the second CORESET0 and the SSB occupy different symbols in the time domain and the second CORESET0 includes the SSB in the frequency domain, the configuration module configures the first CORESET0 such that the first CORESET0 and the SSB occupy different symbols in the time domain and the first CORESET0 includes the SSB in the frequency domain.

Alternatively, in the case where the second CORESET0 and the SSB occupy different resources in the frequency domain, the configuration module configures the first CORESET0 such that the first CORESET0 and the SSB occupy different resources in the frequency domain.

In an embodiment, parameters configured by the configuration module for the first CORESET0 and the second CORESET0 are different, where the configured parameters being different includes at least one of the following: CORESET0s and the SSB being different in relative positions, a number of resource blocks (RBs) occupied by the CORESET0s being different, a number of symbols occupied by the CORESET0s being different, or frequency domain offsets between the CORESET0s and the SSB being different; where the frequency domain offsets represent offsets between the CORESET0s and a frequency domain lower boundary of the SSB, the RBs of the CORESET0s are used as units, a downward offset is expressed as positive, and an upward offset is expressed as negative; and a bandwidth of the first CORESET0 configured by the configuration module satisfies a bandwidth capability of the first type terminal.

The configured parameters being different further includes at least one of the following.

In the case where the first type terminal supports a 10 MHz bandwidth in frequency range 1 or supports a 50 MHz bandwidth in frequency domain range 2, the configuration modules configures the first CORESET0 to be at least one of the following: in the case where a subcarrier interval of the first CORESET0 and a subcarrier interval of the SSB are both 15 KHz, the first CORESET0 and the SSB occupy different symbols in a time domain, the first CORESET0 comprises the SSB in a frequency domain, the first CORESET0 occupies 48 RBs, the number of symbols occupied in the time domain is at least one of 1, 2, or 3, and a frequency domain offset from the SSB is at least one of 12 RBs, 14 RBs, or 16 RBs; or the first CORESET0 and the SSB occupy different resources in the frequency domain, the first CORESET0 occupies 24 RBs, the number of symbols occupied in the time domain is at least one of 2 or 3, and a frequency domain offset from the SSB is at least one of 24 RBs, −20 RBs, or −21 RBs; or any combination of the preceding two situations is configured, and a combination of different situations is achieved through different index values indicated by CORESET0 configuration information.

Alternatively, in the case where a subcarrier interval of the first CORESET0 and a subcarrier interval of the SSB are 30 KHz and 15 KHz, respectively, the first CORESET0 and the SSB occupy different symbols in the time domain, the first CORESET0 includes the SSB in the frequency domain, the first CORESET0 occupies 24 RBs, the number of symbols occupied in the time domain is at least one of 1, 2, or 3, and a frequency domain offset from the SSB is at least one of 5 RBs to 8 RBs.

Alternatively, in the case where a subcarrier interval of the first CORESET0 and a subcarrier interval of the SSB are both 30 KHz, the first CORESET0 and the SSB occupy different symbols in the time domain, the first CORESET0 includes the SSB in the frequency domain, the first CORESET0 occupies 24 RBs, the number of symbols occupied in the time domain is at least one of 1, 2, or 3, and a frequency domain offset from the SSB is at least one of 0 RBs to 4RBs.

Alternatively, in the case where a subcarrier interval of the first CORESET0 and a subcarrier interval of the SSB are 15 KHz and 30 KHz, respectively, the first CORESET0 and the SSB occupy different symbols in the time domain, the first CORESET0 includes the SSB in the frequency domain, the first CORESET0 occupies 48 RBs, the number of symbols occupied in the time domain is at least one of 1, 2, or 3, and a frequency domain offset from the SSB is at least one of 2 RBs, 4RBs, or 6 RBs.

Alternatively, in the case where a subcarrier interval of the first CORESET0 and a subcarrier interval of the SSB are 60 KHz and 120 KHz, respectively, the first CORESET0 and the SSB occupy different symbols in the time domain, the first CORESET0 includes the SSB in the frequency domain, the first CORESET0 occupies 48 RBs, the number of symbols occupied in the time domain is at least one of 1, 2, or 3, and a frequency domain offset from the SSB is at least one of 0 RBs to 8 RBs.

Alternatively, in the case where a subcarrier interval of the first CORESET0 and a subcarrier interval of the SSB are both 120 KHz, respectively, the first CORESET0 and the SSB occupy different symbols in the time domain, the first CORESET0 includes the SSB in the frequency domain, the first CORESET0 occupies 24 RBs, the number of symbols occupied in the time domain is at least one of 1, 2, or 3, and a frequency domain offset from the SSB is at least one of 0 RBs to 4 RBs.

In the case where the first type terminal supports a 20 MHz bandwidth in the frequency range 1 or supports a 100 MHz bandwidth in the frequency range 2, the configuration module configures the first CORESET0 to be at least one of the following: in the case where a subcarrier interval of the first CORESET0 and a subcarrier interval of the SSB are 60 KHz and 120 KHz, respectively, the first CORESET0 and the SSB occupy different symbols in a time domain, the first CORESET0 includes the SSB in a frequency domain, the first CORESET0 occupies 96 RBs, the number of symbols occupied in the time domain is at least one of 1 or 2, and a frequency domain offset from the SSB is 28 RBs; or the first CORESET0 and the SSB occupy different resources in the frequency domain, the first CORESET0 occupies 48 RBs, one symbol is occupied in the time domain, and a frequency domain offset from the SSB is at least one of 49 RBs, −41 RBs, or −42 RBs; or any combination of the preceding two situations is configured, and a combination of different situations is achieved through different index values indicated by CORESET0 configuration information.

Alternatively, in the case where a subcarrier interval of the first CORESET0 and a subcarrier interval of the SSB are both 120 KHz, the first CORESET0 and the SSB occupy different symbols in the time domain, the first CORESET0 includes the SSB in the frequency domain, the first CORESET0 occupies 48 RBs, the number of symbols occupied in the time domain is at least one of 1 or 2, and a frequency domain offset from the SSB is 14 RBs; or the first CORESET0 and the SSB occupy different resources in the frequency domain, the first CORESET0 occupies 24 RBs, two symbols are occupied in the time domain, and a frequency domain offset from the SSB is at least one of 24 RBs, −20 RBs, or −21 RBs; or any combination of the preceding two situations is configured, and the combination of different situations is achieved through the different index values indicated by the CORESET0 configuration information.

Alternatively, in the case where a subcarrier interval of the first CORESET0 and a subcarrier interval of the SSB are 120 KHz and 240 KHz, respectively, the first CORESET0 and the SSB occupy different resources in the time domain, the first CORESET0 includes the SSB in the frequency domain, the first CORESET0 occupies 48 RBs, the number of symbols occupied in the time domain is at least one of 1 or 2, and a frequency domain offset from the SSB is at least one of 0 RBs, 4 RBs, or 8 RBs; or the first CORESET0 and the SSB occupy different resources in the frequency domain, the first CORESET0 occupies 24 RBs, one symbol is occupied in the time domain, and a frequency domain offset from the SSB is at least one of 25 RBs, −41 RBs, or −42 RBs; or any combination of the preceding two situations is configured, and the combination of different situations is achieved through the different index values indicated by the CORESET0 configuration information.

In an example, the sending module is configured to send access control information of the first type terminal.

The access control information of the first type terminal is used for indicating whether a current cell supports an access of the first type terminal; where the access control information of the first type terminal is carried in DCI transmitted in the first CORESET0, a format of the DCI is a DCI format 1_0, and the DCI is scrambled by an SI-RNTI.

In an example, the sending module is configured to send a first access indication of the first type terminal, where the first access indication is carried in the MIB and used for indicating whether a current cell supports an access of the first type terminal, and the first access indication is an existing cell barred indication (cellBarred) in the MIB or the first access indication occupies 1-bit information reserved in the MIB.

In an embodiment, the sending module may also be configured to send a first access indication of the first type terminal and access control information of the first type terminal, where the first access indication is carried in the MIB, the access control information is carried in DCI transmitted in the first CORESET0, a format of the DCI is a DCI format 1_0, the DCI is scrambled by an SI-RNTI, the first access indication and the access control information are used for jointly indicating whether a current cell supports an access of the first type terminal, and the first access indication is an existing cell barred indication (cellBarred) in the MIB, where in the case where the first access indication is that an access is allowed, the first type terminal determines, according to an access indication information field in the DCI format 1_0, whether to perform accessing; and in the case where the first indication access is that an access is rejected, the first type terminal does not access the current cell.

In an embodiment, the sending module is configured to send first short information of the first type terminal, where the first short information of the first type terminal is used for indicating a situation of a system message corresponding to the first type terminal, the first short information is carried in DCI transmitted in the first CORESET0, a format of the DCI is a DCI format 1_0, and the DCI is scrambled by a P-RNTI.

In an embodiment, the sending module is configured to send first short information of the first type terminal, where the first short information of the first type terminal is used for indicating a situation of a system message corresponding to the first type terminal, the first short information and second short information are carried in the same DCI transmitted in the first CORESET0, a format of the DCI is a DCI format 1_0, and the DCI is scrambled by a P-RNTI.

Figure 18:
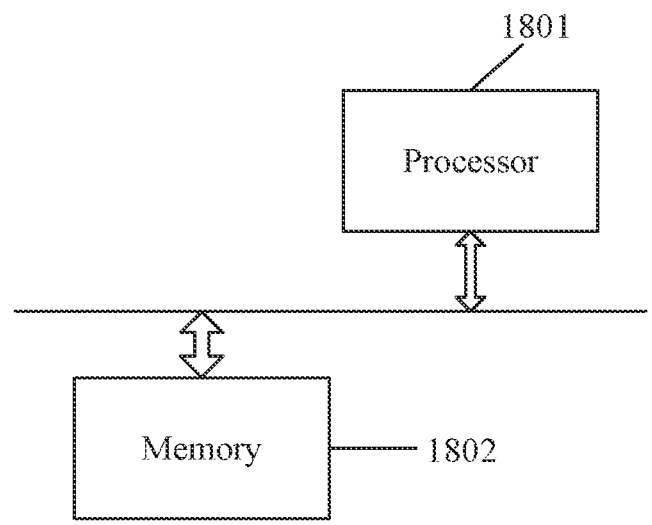
FIG. 18 is a structural diagram of a terminal according to an embodiment.

FIG. 18 is a structural diagram of a terminal according to an embodiment. As shown in FIG. 18, the terminal includes a processor 1801 and a memory 1802. One or more processors 1801 may be provided in the terminal, and one processor 1801 is used as an example in FIG. 18. The processor 1801 and the memory 1802 in the terminal may be connected through a bus or in other manners. In FIG. 18, the connection through the bus is used as an example.

As a computer-readable storage medium, the memory 1802 may be configured to store software programs, computer-executable programs and modules, such as program instructions/modules (for example, the determination module 1601 in FIG. 16) corresponding to the network access method in the embodiment of the present application shown in FIG. 1. The processor 1801 performs the configuration information determination method by running the software programs, instructions and modules stored in the memory 1802.

The memory 1802 may mainly include a program storage region and a data storage region, where the program storage region may store an operating system and an application program required by at least one function while the data storage region may store data created depending on use of a device. Additionally, the memory 1802 may include a high-speed random-access memory and may further include a non-volatile memory, for example, at least one magnetic disk memory and flash memory or other non-volatile solid-state memories.

Figure 19:
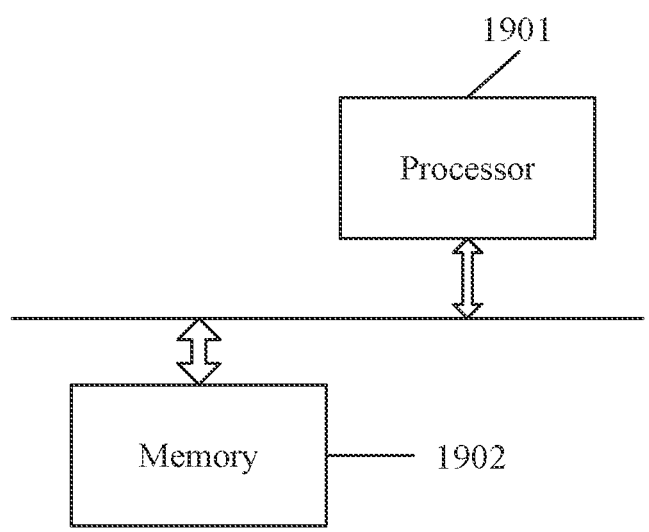
FIG. 19 is a structural diagram of a base station according to an embodiment.

FIG. 19 is a structural diagram of a base station according to an embodiment. As shown in FIG. 19, the terminal includes a processor 1901 and a memory 1902. One or more processors 1901 may be provided in the base station, and one processor 1901 is used as an example in FIG. 19. The processor 1901 and the memory 1902 in the base station may be connected through a bus or in other manners. In FIG. 19, the connection through the bus is used as an example.

As a computer-readable storage medium, the memory 1902 may be configured to store software programs, computer-executable programs and modules, such as program instructions/modules (for example, the sending module 1701 and the configuration module 1702 in FIG. 17) corresponding to the network access method in the embodiment of the present application shown in FIG. 1. The processor 1901 performs the information configuration method by running the software programs, instructions and modules stored in the memory 1902.

The memory 1902 may mainly include a program storage region and a data storage region, where the program storage region may store an operating system and an application program required by at least one function while the data storage region may store data created depending on use of a device. Additionally, the memory 1902 may include a high-speed random-access memory and may further include a non-volatile memory, for example, at least one magnetic disk memory and flash memory or other non-volatile solid-state memories.

An embodiment of the present application further provides a storage medium including computer-executable instructions, and the computer-executable instructions are used for performing a configuration information determination method when executed by a computer processor. The method includes the following.

A first type terminal determines, according to PDCCH configuration signaling corresponding to SIB1 in an MIB sent by a base station, configuration information of first CORESET0 corresponding to the first type terminal, where the PDCCH configuration signaling corresponding to the SIB1 in the MIB corresponds to a second CORESET0 corresponding to a second type terminal.

An embodiment of the present application further provides a storage medium including computer-executable instructions, and the computer-executable instructions are used for performing an information configuration method when executed by a computer processor. The method includes the following.

A base station sends PDCCH configuration signaling corresponding to SIB1 in an MIB, where the PDCCH configuration signaling is used for indicating configuration information of first CORESET0 corresponding to a first type terminal, and the PDCCH configuration signaling corresponding to the SIB1 in the MIB corresponds to a second CORESET0 corresponding to a second type terminal.

The above are only exemplary embodiments of the present application and are not intended to limit the scope of the present application.

In general, multiple embodiments of the present application may be implemented in hardware, a dedicated circuit, software, logic, or any combination thereof. For example, some aspects may be implemented in hardware while other aspects may be implemented in firmware or software that may be performed by a controller, a microprocessor, or other computing apparatuses, though the present application is not limited thereto.

The embodiments of the present application may be implemented by computer program instructions executed by data processors of one or more types of mobile apparatuses in the preceding embodiments, for example, in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

The block diagrams of any logic flows in the drawings of the present application may represent program steps, or may represent interconnected logic circuits, modules, and functions, or may represent a combination of program steps and logic circuits, and modules and functions. The computer program may be stored in a memory. The memory may be of any type suitable for the local technical environment and may be implemented using any suitable data storage technology, such as, but not limited to, a read-only memory (ROM), a random-access memory (RAM) and an optical memory device and system (a digital video disc (DVD) or a compact disc (CD)). The computer-readable medium may include a non-transitory storage medium. The data processor may be in any type suitable for the local technical environment, for example, but not limited to, a general-purpose computer, a special-purpose computer, a microprocessor, a digital signal processor (DSP), an application-specific integrated circuit (ASIC), a field-programmable gate array (FGPA), and a processor based on a multi-core processor architecture.

It is to be noted that units and modules involved in the embodiment of the preceding apparatus are just divided according to a functional logic, and the division is not limited to this, as long as the corresponding functions can be achieved. In addition, the specific names of functional units are just intended for distinguishing between each other.

What is claimed is:

1. A configuration information determination method, comprising:
 determining, by a first type terminal, according to physical downlink control channel (PDCCH) configuration signaling corresponding to system information block 1

(SIB1) in a master information block (MIB) sent by a base station, configuration information of a first control resource set zero (CORESET0) corresponding to the first type terminal, wherein the PDCCH configuration signaling corresponding to the SIB1 in the MIB corresponds to a second CORESET0 corresponding to a second type terminal, and wherein the first type terminal is different from the second type terminal in at least one of a bandwidth, a cost, complexity, a processing capability, power consumption, or a device size;

wherein the second CORESET0 is the same as the first CORESET0 in a case where the second CORESET0 is applicable to the first type terminal;

wherein in a case where the second CORESET0 is not applicable to the first type terminal, determining, by the first type terminal, according to the PDCCH configuration signaling corresponding to the SIB1 in the MIB, the configuration information of the first CORESET0 corresponding to the first type terminal comprises acquiring, by the first type terminal, according to the PDCCH configuration signaling corresponding to the SIB1 in the MIB, the configuration information of the first CORESET0; and wherein a time domain position of the first CORESET0 comprises: the first CORESET0 is adjacent to a Synchronization Signal and Physical Broadcast CHannel Block (SSB) in a time domain: or an offset exists between the first CORESET0 and the SSB.

2. The method of claim 1, wherein in a case where the second CORESET0 and an SSB occupy different symbols in the time domain, the second CORESET0 comprises the SSB in a frequency domain, the first CORESET0 and the SSB occupy different symbols in the time domain, and the first CORESET0 comprises the SSB in the frequency domain, the first type terminal determines the time domain position of the first CORESET0 according to the second CORESET0; wherein the time domain position of the first CORESET0 further comprises: the first CORESET0 is adjacent to the second CORESET0 in the time domain; or an offset exists between the first CORESET0 and the second CORESET0;

wherein in a case where the second CORESET0 and an SSB occupy different symbols in the time domain, the second CORESET0 comprises the SSB in a frequency domain, the first CORESET0 and the SSB occupy different symbols in the time domain, and the first CORESET0 comprises the SSB in the frequency domain, the first type terminal determines the time domain position of the first CORESET0 according to the SSB;

wherein in a case where the second CORESET0 and an SSB occupy different symbols in the time domain, the second CORESET0 comprises the SSB in a frequency domain, and the first CORESET0 and the SSB occupy different resources in the frequency domain, the first CORESET0 has a fixed relative position with the SSB;

wherein in a case where the second CORESET0 and an SSB occupy different resources in a frequency domain, the first CORESET0 and the SSB occupy different symbols in the time domain, and the first CORESET0 comprises the SSB in the frequency domain, the first type terminal determines position information of the first CORERSET0 according to configuration information of search space 0; wherein the configuration information of the search space 0 is part of information of the PDCCH configuration signaling corresponding to the SIB1 in the MIB;

wherein in a case where the second CORESET0 and an SSB occupy different resources in a frequency domain and the first CORESET0 and the SSB occupy different resources in the frequency domain, the first CORESET0 has a fixed relative position with the SSB;

wherein determining, by the first type terminal, the configuration information of the first CORESET0 according to the second CORESET0 and the PDCCH configuration signaling comprises: in a case where the PDCCH configuration signaling indicates a relationship between the second CORESET0 and an SSB is that the second CORESET0 and the SSB occupy different symbols in the time domain and the second CORESET0 comprises the SSB in a frequency domain, determining a relationship between the first CORESET0 and the SSB to be that the first CORESET0 and the SSB occupy different symbols in the time domain and the first CORESET0 to be comprise the SSB in the frequency domain; or in a case where the PDCCH configuration signaling indicates the relationship between the second CORESET0 and the SSB is that the second CORESET0 and the SSB occupy different resources in the frequency domain, determining the relationship between the first CORESET0 and the SSB to be that the first CORRESET0 and the SSB occupy different resources in the frequency domain; or wherein a configuration of the first CORESET0 and a configuration of the second CORESET0 are different, wherein the configuration of the first CORESET0 and the configuration of the second CORESET0 being different comprises at least one of the following: CORESET0s and an SSB being different in relative positions, a number of resource blocks (RBs) occupied by the CORESET0s being different, a number of symbols occupied by the CORESET0s being different, or frequency domain offsets between the CORESET0s and the SSB being different; wherein the frequency domain offsets represent offsets between the CORESET0s and a frequency domain lower boundary of the SSB, the RBs occupied by the CORESET0s are used as units, a downward offset is expressed as positive, and an upward offset is expressed as negative; and a bandwidth configuration of the first CORESET0 satisfies a bandwidth capability of the first type terminal.

3. The method of claim 2, wherein the configuration of the first CORESET0 and the configuration of the second CORESET0 being different further comprises at least one of the following:

in a case where the first type terminal supports a 10 MHz bandwidth in frequency range 1 or supports a 50 MHz bandwidth in a frequency range 2, the first CORESET0 is configured to be at least one of the following:
in a case where a subcarrier interval of the first CORESET0 and a subcarrier interval of the SSB are both 15 KHz, the first CORESET0 and the SSB occupy different symbols in the time domain, the first CORESET0 comprises the SSB in a frequency domain, the first CORESET0 occupies 48 RBs in the frequency domain, a number of symbols occupied in the time domain is at least one of 1, 2, or 3, and the frequency domain offset from the SSB is at least one of 12 RBs, 14 RBs, or 16 RBs; or the first CORESET0 and the SSB occupy different resources in the frequency domain, the first CORESET0 occupies 24 RBs, the number of symbols occupied in the time domain is at least one of 2 or 3, and a frequency domain offset from the SSB is at least one of 24 RBs, −20 RBs, or −21 RBs; or an index indicated by CORESET0 configuration information in the PDCCH configuration signaling in the MIB comprises both a case where the first CORESET0 and the SSB occupy different symbols in the time domain and the first CORESET0 comprises the SSB in the frequency domain and a case where the first CORESET0 and the SSB occupy different resources in the frequency domain; or in a case where a subcarrier interval of the first CORESET0 and a subcarrier interval of the SSB are 30 KHz and 15 KHz, respectively, the first CORESET0 and the SSB occupy different symbols in the time domain, the first CORESET0 comprises the SSB in the frequency domain, the first CORESET0 occupies 24 RBs, the number of symbols occupied in the time domain is at least one of 1, 2, or 3, and a frequency domain offset from the SSB is at least one of 5 RBs to 8 RBs; or in a case where a subcarrier intervals interval of the first CORESET0 and a subcarrier interval of the SSB are both 30 KHz, the first CORESET0 and the SSB occupy different symbols in the time domain, the first CORESET0 comprises the SSB in the frequency domain, the first CORESET0 occupies 24 RBs, the number of symbols occupied in the time domain is at least one of 1, 2, or 3, and a frequency domain offset from the SSB is at least one of 0 RBs to 4RBs; or in a case where a subcarrier interval of the first CORESET0 and a subcarrier interval of the SSB are 15 KHz and 30 KHz, respectively, the first CORESET0 and the SSB occupy different symbols in the time domain, the first CORESET0 comprises the SSB in the frequency domain, the first CORESET0 occupies 48 RBs, the number of symbols occupied in the time domain is at least one of 1, 2, or 3, and a frequency domain offset from the SSB is at least one of 2 RBs, 4RBs, or 6 RBs; or in a case where a subcarrier interval of the first CORESET0 and a subcarrier interval of the SSB are 60 KHz and 120 KHz, respectively, the first CORESET0 and the SSB occupy different symbols in the time domain, the first CORESET0 comprises the SSB in the frequency domain, the first CORESET0 occupies 48 RBs, the number of symbols occupied in the time domain is at least one of 1, 2, or 3, and a frequency domain offset from the SSB is at least one of 0 RBs to 8 RBs; or in a case where a subcarrier interval of the first CORESET0 and a subcarrier interval of the SSB are both 120 KHz, the first CORESET0 and the SSB occupy different symbols in the time domain, the first CORESET0 comprises the SSB in the frequency domain, the first CORESET0 occupies 24 RBs, the number of symbols occupied in the time domain is at least one of 1, 2, or 3, and a frequency domain offset from the SSB is at least one of 0 RBs to 4 RBs; or in a case where the first type terminal supports a 20 MHz bandwidth in the frequency range 1 or supports a 100 MHz bandwidth in the frequency range 2, the first CORESET0 is configured to be at least one of the following:

in a case where a subcarrier interval of the first CORESET0 and a subcarrier interval of the SSB are 60 KHz and 120 KHz, respectively, the first CORESET0 and the SSB occupy different symbols in the time domain, the first CORESET0 comprises the SSB in a frequency domain, the first CORESET0 occupies 96 RBs, the number of symbols occupied in the time domain is at least one of 1 or 2, and a frequency domain offset from the SSB is 28 RBs; or the first CORESET0 and the SSB occupy different resources in the frequency domain, the first CORESET0 occupies 48 RBs, one symbol is occupied in the time domain, and the frequency domain offset from the SSB is at least one of 49 RBs, −41 RBs, or −42 RBs; or an index indicated by CORESET0 configuration information in the PDCCH configuration signaling in the MIB comprises both a case where the first CORESET0 and the SSB occupy different symbols in the time domain and the first CORESET0 comprises the SSB in the frequency domain and a case where the first CORESET0 and the SSB occupy different resources in the frequency domain; or in a case where a subcarrier interval of the first CORESET0 and a subcarrier interval of the SSB are both 120 KHz, the first CORESET0 and the SSB occupy different symbols in the time domain, the first CORESET0 comprises the SSB in the frequency domain, the first CORESET0 occupies 48 RBs, the number of symbols occupied in the time domain is at least one of 1, 2, or 3, and a frequency domain offset from the SSB is 14 RBs; or the first CORESET0 and the SSB occupy different resources in the frequency domain, the first CORESET0 occupies 24 RBs, two symbols are occupied in the time domain, and the frequency domain offset from the SSB is at least one of 24 RBs, −20 RBs, or −21 RBs; or the index indicated by the CORESET0 configuration information in the PDCCH configuration signaling in the MIB comprises both the case where the first CORESET0 and the SSB occupy different symbols in the time domain and the first CORESET0 comprises the SSB in the frequency domain and the case where the first CORESET0 and the SSB occupy different resources in the frequency domain; or in a case where a subcarrier interval of the first CORESET0 and a subcarrier interval of the SSB are 120 KHz and 240 KHz, respectively, the first CORESET0 and the SSB occupy different resources in the time domain, the first CORESET0 comprises the SSB in the frequency domain, the first CORESET0 occupies 48 RBs, the number of symbols occupied in the time domain is at least one of 1 or 2, and a frequency domain offset from the SSB is at least one of 0 RBs, 4 RBs, or 8 RBs; or the first CORESET0 and the SSB occupy different resources in the frequency domain, the first CORESET0 occupies 24 RBs in the frequency domain, one symbol is occupied in the time domain, and the frequency domain offset from the SSB is at least one of 25 RBs, −41 RBs, or −42 RBs; or the index indicated by the CORESET0 configuration signaling in the MIB comprises both the case where the first CORESET0 and the SSB occupy different symbols in the time domain and the first CORESET0 comprises the SSB in the frequency domain and the case where the first CORESET0 and the SSB occupy different resources in the frequency domain.

4. The method of claim 1, wherein the first type terminal determines whether a current cell supports an access of the first type terminal according to access indication information in a downlink control information format 1_0 (DCI format 1_0), DCI corresponding to the access indication information is transmitted in the first CORESET0, and the DCI is scrambled by a system information-radio network temporary identity (SI-RNTI); or the first type terminal determines whether the current cell supports the access of the first type terminal according to whether the current cell is configured with the first CORESET0.

5. The method of claim 4, wherein determining, by the first type terminal, according to the access indication information in the DCI format 1_0, whether the current cell supports the access of the first type terminal comprises ignoring, by the first type terminal, a cell barred indication (cellBarred) in the MIB and determining, according to the access indication information in the DCI format 1_0, whether the current cell is accessible.

6. The method of claim 1,
wherein the first type terminal determines whether a current cell supports an access of the first type terminal according to a first access indication in the MIB, wherein the first access indication is an existing cell barred indication (cellBarred) in the MIB or 1-bit information reserved in the MIB is occupied as a separate first access indication; or
wherein the first type terminal determines, according to a common indication of a first access indication in the MIB and access indication information in a DCI format 1_0 scrambled by an SI-RNTI, whether a current cell supports an access of the first type terminal, wherein the first access indication is an existing cell barred indication (cellBarred) in the MIB; wherein in a case where the first access indication is that an access is allowed, the first type terminal determines, according to the access indication information in the DCI format 1_0, whether to perform accessing; and in a case where the first access indication is that an access is rejected, the first type terminal does not access the current cell.

7. The method of claim 1, further comprising: determining, by the first type terminal, a situation of a system message corresponding to the first type terminal according to first short information in a DCI format 1_0;
wherein DCI corresponding to the first short information is transmitted in the first CORESET0, and the DCI is scrambled by a paging-radio network temporary identity (P-RNTI); or
the DCI corresponding to the first short information is transmitted in the first CORESET0, the DCI is scrambled by the P-RNTI, and the first short information and second short information are transmitted in a same DCI format, wherein the second short information is used for determining a situation of a system message corresponding to the second type terminal.

8. An information configuration method, comprising:
sending, by a base station, physical downlink control channel (PDCCH) configuration signaling corresponding to system information block 1 (SIB1) in a master information block (MIB), wherein the PDCCH configuration signaling is used for indicating configuration information of a first control resource set zero (CORESET0) corresponding to a first type terminal, and the PDCCH configuration signaling corresponding to the SIB1 in the MIB corresponds to a second CORESET0 corresponding to a second type terminal, and the first type terminal is different from the second type terminal in at least one of a bandwidth, a cost, complexity, a processing capability, power consumption, or a device size,
wherein the second CORESET0 is same as the first CORESET0 in a case where the second CORESET0 is applicable to the first type terminal; or the method further comprises: in a case where the second CORESET0 is not applicable to the first type terminal, acquiring, by the first type terminal, according to the PDCCH configuration signaling corresponding to the SIB1 in the MIB, the configuration information of the first CORESET0; and
wherein a time domain positional relationship between the first CORESET0 and a Synchronization Signal and Physical Broadcast CHannel Block (SSB) comprises: the first CORESET0 is adjacent to the SSB in a time domain; or an offset exists between the first CORESET0 and the SSB.

9. The method of claim 8,
wherein in a case where the second CORESET0 and an SSB occupy different symbols in the time domain and the second CORESET0 comprises the SSB in a frequency domain, the base station configures the first CORESET0 such that the first CORESET0 and the SSB occupy different symbols in the time domain and the first CORESET0 comprises the SSB in the frequency domain, wherein a positional relationship between the configured first CORESET0 and the second CORESET0 further comprises: the first CORESET0 and the second CORESET0 are configured to be adjacent in the time domain; or the first CORESET0 and the second CORESET0 are configured to be in a non-adjacent relationship in the time domain, and an offset exists between the first CORESET0 and the second CORESET0;
wherein in a case where the second CORESET0 and an SSB occupy different symbols in the time domain and the second CORESET0 comprises the SSB in a frequency domain, the base station configures the first CORESET0 such that the first CORESET0 and the SSB occupy different symbols in the time domain and the first CORESET0 comprises the SSB in the frequency domain;
wherein in a case where the second CORESET0 and an SSB occupy different symbols in the time domain and the second CORESET0 comprises the SSB in a frequency domain, the base station configures the first CORESET0 such that the first CORESET0 and the SSB occupy different resources in the frequency domain and the first CORESET0 has a fixed relative position with the SSB;
wherein in a case where the second CORESET0 and an SSB occupy different resources in a frequency domain, the base station configures the first CORESET0 such that the first CORESET0 and the SSB occupy different symbols in the time domain and the first CORESET0 comprises the SSB in the frequency domain, and the base station indicates position information of the first CORESET0 through configuration information of search space 0, wherein the configuration information of the search space 0 is part information of PDCCH configuration signaling corresponding to the SIB1 in the MIB;

wherein in a case where the second CORESET0 and an SSB occupy different resources in a frequency domain, the base station configures the first CORESET0 such that the first CORESET0 and the SSB occupy different resources in the frequency domain and the first CORESET0 has a fixed relative position with the SSB;

wherein the base station configures the first CORESET0 to be associated with the second CORESET0, wherein a configuration manner of association configuration comprises: in a case where the second CORESET0 and an SSB occupy different symbols in the time domain and the second CORESET0 comprises the SSB in a frequency domain, the base station configures the first CORESET0 such that the first CORESET0 and the SSB occupy different symbols in the time domain and the first CORESET0 comprises the SSB in the frequency domain; or in a case where the second CORESET0 and the SSB occupy different resources in the frequency domain, the base station configures the first CORESET0 such that the first CORESET0 and the SSB occupy different resources in the frequency domain; or wherein parameters configured by the base station for the first CORESET0 and the second CORESET0 are different, wherein the configured parameters being different comprises at least one of the following: CORESET0s and an SSB being different in relative positions, a number of resource blocks (RBs) occupied by the CORESET0s being different, a number of symbols occupied by the CORESET0s being different, or frequency domain offsets between the CORESET0s and the SSB being different; wherein the frequency domain offsets represent offsets between the CORESET0s and a frequency domain lower boundary of the SSB, the RBs occupied by the CORESET0s are used as units, a downward offset is expressed as positive, and an upward offset is expressed as negative; and a bandwidth of the first CORESET0 configured by the base station satisfies a bandwidth capability of the first type terminal.

10. The method of claim 9, wherein the configured parameters being different further comprises at least one of the following:

in a case where the first type terminal supports a 10 MHz bandwidth in frequency range 1 or supports a 50 MHz bandwidth in frequency range 2, the base station configures the first CORESET0 to be at least one of the following:

in a case where a subcarrier interval of the first CORESET0 and a subcarrier interval of the SSB are both 15 KHz, the first CORESET0 and the SSB occupy different symbols in the time domain, the first CORESET0 comprises the SSB in a frequency domain, the first CORESET0 occupies 48 RBs, a number of symbols occupied in the time domain is at least one of 1, 2, or 3, and a frequency domain offset from the SSB is at least one of 12 RBs, 14 RBs, or 16 RBs; or the first CORESET0 and the SSB occupy different resources in the frequency domain, the first CORESET0 occupies 24 RBs, the number of symbols occupied in the time domain is at least one of 2 or 3, and the frequency domain offset from the SSB is at least one of 24 RBs, −20 RBs, or −21 RBs; or a combination of the preceding two situations is configured, and a combination of different situations is achieved through different index values indicated by CORESET0 configuration information; or in a case where a subcarrier interval of the first CORESET0 and a subcarrier interval of the SSB are 30 KHz and 15 KHz, respectively, the first CORESET0 and the SSB occupy different symbols in the time domain, the first CORESET0 comprises the SSB in a frequency domain, the first CORESET0 occupies 24 RBs, the number of symbols occupied in the time domain is at least one of 1, 2, or 3, and a frequency domain offset from the SSB is at least one of 5 RBs to 8 RBs; or in a case where a subcarrier interval of the first CORESET0 and a subcarrier interval of the SSB are both 30 KHz, the first CORESET0 and the SSB occupy different symbols in the time domain, the first CORESET0 comprises the SSB in the frequency domain, the first CORESET0 occupies 24 RBs, the number of symbols occupied in the time domain is at least one of 1, 2, or 3, and a frequency domain offset from the SSB is at least one of 0 RBs to 4RBs; or in a case where a subcarrier interval of the first CORESET0 and a subcarrier interval of the SSB are 15 KHz and 30 KHz, respectively, the first CORESET0 and the SSB occupy different symbols in the time domain, the first CORESET0 comprises the SSB in the frequency domain, the first CORESET0 occupies 48 RBs, the number of symbols occupied in the time domain is at least one of 1, 2, or 3, and a frequency domain offset from the SSB is at least one of 2 RBs, 4RBs, or 6 RBs; or in a case where a subcarrier interval of the first CORESET0 and a subcarrier interval of the SSB are 60 KHz and 120 KHz, respectively, the first CORESET0 and the SSB occupy different symbols in the time domain, the first CORESET0 comprises the SSB in the frequency domain, the first CORESET0 occupies 48 RBs, the number of symbols occupied in the time domain is at least one of 1, 2, or 3, and a frequency domain offset from the SSB is at least one of 0 RBs to 8 RBs; or in a case where a subcarrier interval of the first CORESET0 and a subcarrier interval of the SSB are both 120 KHz, the first CORESET0 and the SSB occupy different symbols in the time domain, the first CORESET0 comprises the SSB in the frequency domain, the first CORESET0 occupies 24 RBs, the number of symbols occupied in the time domain is at least one of 1, 2, or 3, and a frequency domain offset from the SSB is at least one of 0 RBs to 4 RBs; or in a case where the first type terminal supports a 20 MHz bandwidth in the frequency range 1 or supports a 100 MHz bandwidth in the frequency range 2, the base station configures the first CORESET0 to be at least one of the following:

in a case where a subcarrier interval of the first CORESET0 and a subcarrier interval of the SSB are 60 KHz and 120 KHz, respectively, the first CORESET0 and the SSB occupy different symbols in the time domain, the first CORESET0 comprises the SSB in a frequency domain, the first CORESET0 occupies 96 RBs, the number of symbols occupied in the time domain is at least one of 1 or 2, and a frequency domain offset from the SSB is 28 RBs; or the first CORESET0 and the SSB occupy different resources in the frequency domain, the first CORESET0 occupies 48 RBs, one symbol is occupied in the time domain, and the frequency domain offset from the SSB is at least one of 49 RBs, −41 RBs, or −42 RBs; or a combination of the preceding two situations is configured, and a combination of different situations is achieved through different index values indicated by CORESET0 configuration information; or in a case where a subcarrier interval of the first CORESET0 and a subcarrier interval of the SSB are both 120 KHz, the first CORESET0 and the SSB occupy different symbols in the time domain, the first CORESET0 comprises the SSB in the frequency domain, the first CORESET0 occupies 48 RBs, the number of symbols occupied in the time domain is at least one of 1 or 2, and a frequency domain offset from the SSB is 14 RBs; or the first CORESET0 and the SSB occupy different resources in the frequency domain, the first CORESET0 occupies 24 RBs, two symbols are occupied in the time domain, and the frequency domain offset from the SSB is at least one of 24 RBs, −20 RBs, or −21 RBs; or a combination of the preceding two situations is configured, and the combination of different situations is achieved through the different index values indicated by the CORESET0 configuration information; or in a case where a subcarrier interval of the first CORESET0 and a subcarrier interval of the SSB are 120 KHz and 240 KHz, respectively, the first CORESET0 and the SSB occupy different resources in the time domain, the first CORESET0 comprises the SSB in the frequency domain, the first CORESET0 occupies 48 RBs, the number of symbols occupied in the time domain is at least one of 1 or 2, and a frequency domain offset from the SSB is at least one of 0 RBs, 4 RBs, or 8 RBs; or the first CORESET0 and the SSB occupy different resources in the frequency domain, the first CORESET0 occupies 24 RBs, one symbol is occupied in the time domain, and the frequency domain offset from the SSB is at least one of 25 RBs, −41 RBs, or −42 RBs; or a combination of the preceding two situations is configured, and the combination of different situations is achieved through the different index values indicated by the CORESET0 configuration information.

11. The method of claim 8, wherein the base station sends access control information of the first type terminal, wherein the access control information of the first type terminal is used for indicating whether a current cell supports an access of the first type terminal; wherein the access control information of the first type terminal is carried in downlink control information (DCI) transmitted in the first CORESET0, a format of the DCI is a DCI format 1_0, and the DCI is scrambled by a system information-radio network temporary identity (SI-RNTI).

12. The method of claim 8, wherein the base station sends a first access indication of the first type terminal, wherein the first access indication is carried in the MIB and used for indicating whether a current cell supports an access of the first type terminal, and the first access indication is an existing cell barred indication (cellBarred) in the MIB or 1-bit information reserved in the MIB is occupied as a separate first access indication.

13. The method of claim 8, wherein the base station sends a first access indication of the first type terminal and access control information of the first type terminal, wherein the first access indication is carried in the MIB, the access control information is carried in DCI transmitted in the first CORESET0, a format of the DCI is a DCI format 1_0, the DCI is scrambled by an SI-RNTI, the first access indication and the access control information are used for jointly indicating whether a current cell supports an access of the first type terminal, and the first access indication is an existing cell barred indication (cellBarred) in the MIB, wherein in a case where the first access indication is that an access is allowed, the first type terminal determines, according to access indication information in the DCI format 1_0, whether to perform accessing; and in a case where the first indication access is that an access is rejected, the first type terminal does not access the current cell.

14. The method of claim 8, wherein the base station sends first short information of the first type terminal, wherein the first short information of the first type terminal is used for indicating a situation of a system message corresponding to the first type terminal, the first short information is carried in DCI transmitted in the first CORESET0, a format of the DCI is a DCI format 1_0, and the DCI is scrambled by a paging-radio network temporary identity (P-RNTI); or the base station sends first short information of the first type terminal, wherein the first short information of the first type terminal is used for indicating a situation of a system message corresponding to the first type terminal, the first short information and second short information are carried in a same DCI format transmitted in the first CORESET0, a format of the DCI is a DCI format 1_0, the DCI is scrambled by a P-RNTI, and the second short information is used for determining a situation of a system message corresponding to the second type terminal.

15. A terminal, comprising a memory, a processor, and a computer program stored in the memory and executable by the processor, wherein the processor, when executing the computer program, performs the following steps:

determining, by a first type terminal, according to physical downlink control channel (PDCCH) configuration signaling corresponding to system information block 1 (SIB1) in a master information block (MIB) sent by a base station, configuration information of a first control resource set zero (CORESET0) corresponding to the first type terminal, wherein the PDCCH configuration signaling corresponding to the SIB1 in the MIB corresponds to a second CORESET0 corresponding to a second type terminal, and wherein the first type terminal is different from the second type terminal in at least one of a bandwidth, a cost, complexity, a processing capability, power consumption, or a device size;

wherein the second CORESET0 is the same as the first CORESET0 in a case where the second CORESET0 is applicable to the first type terminal;

wherein in a case where the second CORESET0 is not applicable to the first type terminal, determining, by the first type terminal, according to the PDCCH configuration signaling corresponding to the SIB1 in the MIB, the configuration information of the first CORESET0 corresponding to the first type terminal comprises acquiring, by the first type terminal, according to the PDCCH configuration signaling corresponding to the SIB1 in the MIB, the configuration information of the first CORESET0; and wherein a time domain position of the first CORESET0 comprises: the first CORESET0 is adjacent to a Synchronization Signal and Physical Broadcast CHannel Block (SSB) in a time domain; or an offset exists between the first CORESET0 and the SSB.

16. A base station, comprising a memory, a processor, and a computer program stored in the memory and executable by the processor, wherein the processor, when executing the computer program, performs the method of claim 8.

* * * * *